(12) United States Patent
Suzuki

(10) Patent No.: US 9,031,232 B2
(45) Date of Patent: May 12, 2015

(54) BIT SEQUENCE GENERATION APPARATUS AND BIT SEQUENCE GENERATION METHOD

(75) Inventor: Daisuke Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 519 days.

(21) Appl. No.: 13/522,439

(22) PCT Filed: Jan. 15, 2010

(86) PCT No.: PCT/JP2010/050422
§ 371 (c)(1),
(2), (4) Date: Jul. 16, 2012

(87) PCT Pub. No.: WO2011/086688
PCT Pub. Date: Jul. 21, 2011

(65) Prior Publication Data
US 2012/0293354 A1 Nov. 22, 2012

(51) Int. Cl.
*G06F 21/00* (2013.01)
*H03K 3/84* (2006.01)
*H04L 9/08* (2006.01)
*G06F 7/58* (2006.01)

(52) U.S. Cl.
CPC .............. *H03K 3/84* (2013.01); *H04L 9/0869* (2013.01); *G06F 7/58* (2013.01); *H04L 9/0866* (2013.01)

(58) Field of Classification Search
CPC ...... H04L 9/0869; H04L 9/0866; H03K 3/84; G06F 7/58
USPC ......................................................... 380/44
See application file for complete search history.

(56) References Cited

U.S. PATENT DOCUMENTS

| 3,789,377 | A | * | 1/1974 | Norris .............................. 360/43 |
| 3,826,868 | A | * | 7/1974 | Nugent ......................... 370/215 |
| 6,588,672 | B1 | | 7/2003 | Usami |
| 7,243,117 | B2 | | 7/2007 | Yamamoto et al. |
| 2005/0193045 | A1 | | 9/2005 | Yamamoto |

(Continued)

FOREIGN PATENT DOCUMENTS

| JP | 2002 366347 | 12/2002 |
| JP | 2004 280486 | 10/2004 |

(Continued)

OTHER PUBLICATIONS

Altera, "Design Guidelines for HardCopy Series Devices," Hardcopy Series Handbook vol. 1, pp. 11-1 to 11-32, (Sep. 2008).

(Continued)

*Primary Examiner* — Michael Pyzocha
(74) *Attorney, Agent, or Firm* — Oblon, McClelland, Maier & Neustadt, L.L.P.

(57) ABSTRACT

A bit sequence generation apparatus includes a glitch generating circuit that generates a glitch, a sampling circuit that samples the glitch waveform generated by the glitch generating circuit, and a glitch shape determination circuit that generates 1-bit data indicating either 1 or 0, based on the glitch waveform sampled by the sampling circuit, and generates a bit sequence composed of a plurality of generated 1-bit data. The bit sequence generation apparatus can provide a PUF circuit that is able to generate highly randomized secret information even in a device with a low degree of freedom of alignment and wiring and that does not violate the design rules.

15 Claims, 19 Drawing Sheets

(56) References Cited

U.S. PATENT DOCUMENTS

| | | | |
|---|---|---|---|
| 2007/0250938 | A1 | 10/2007 | Suh et al. |
| 2009/0132624 | A1* | 5/2009 | Haselsteiner et al. ........ 708/255 |
| 2009/0265758 | A1 | 10/2009 | Tuyls |
| 2010/0070777 | A1 | 3/2010 | Salters et al. |

FOREIGN PATENT DOCUMENTS

| | | |
|---|---|---|
| JP | 2007 34836 | 2/2007 |
| JP | 2008 517365 | 5/2008 |
| JP | 2009 524998 | 7/2009 |
| JP | 2009 533741 | 9/2009 |
| JP | 2009 533927 | 9/2009 |
| WO | 99 08192 | 2/1999 |

OTHER PUBLICATIONS

Altera, "Design Recommendations for Altera Devices and the Quartus II Design Assistant," Quartus II Handbook Version 9.0 vol. 1, Design and Synthesis, pp. 5-1 to 5-46, (Mar. 2009).

International Search Report Issued Apr. 6, 2010 in PCT/JP10/50422 Filed Jan. 15, 2010.

Office Action issued Jun. 11, 2013 in Japanese Application No. 2011-549823 (With Partial English Translation).

Hiren Patel, et al., "Increasing Stability and Distinguishability of the Digital Fingerprint in FPGAS Through Input Word Analysis", International Conference on Field Programmable Logic and Applications, 2009, pp. 391-396.

Chinese Office Action issued Aug. 5, 2014, in Chinese Patent Application No. 201080061364.0 (with English translation).

Extended European Search Report issued Feb. 4, 2014 in Patent Application No. 10843047.1.

James W. Crouch, et al., "Creating unique identifiers on field programmable gate arrays using natural processing variations", Field Programmable Logic and Applications, 2008. FPL 2008. International Conference on, IEEE, XP-031324428, Sep. 8, 2008, pp. 579-582.

Hiren J. Patel, et al., "Creating a unique digital fingerprint using existing combinational logic", Circuits and Systems, 2009. ISCAS 2009. IEEE International Symposium on, IEEE, XP-031479799, May 24, 2009, pp. 2693-2696.

Daisuke Suzuki, et al., "The glitch PUF: A new delay-PUF architecture exploiting glitch shapes", Cryptographic Hardware and Embedded Systems, CHES 2010, vol. 6225, XP-019148566, Aug. 17, 2010, pp. 366-382.

* cited by examiner

Fig. 12

| GLITCH PUF CIRCUIT PERFORMANCE | |
|---|---|
| SoC TOTAL EVALUATION | SLICEs USED: 3,186/3,584<br>BRAMs USED: 10/20<br>18×18 MULTIPLIERS USED: 3/20<br>OPERATING FREQUENCY: 50MHz |
| GLITCH PUF EVALUATION | SLICEs USED: 891/3,584<br>BRAMs USED: 0/20<br>18×18 MULTIPLIERS USED: 0/20 |

Fig. 16
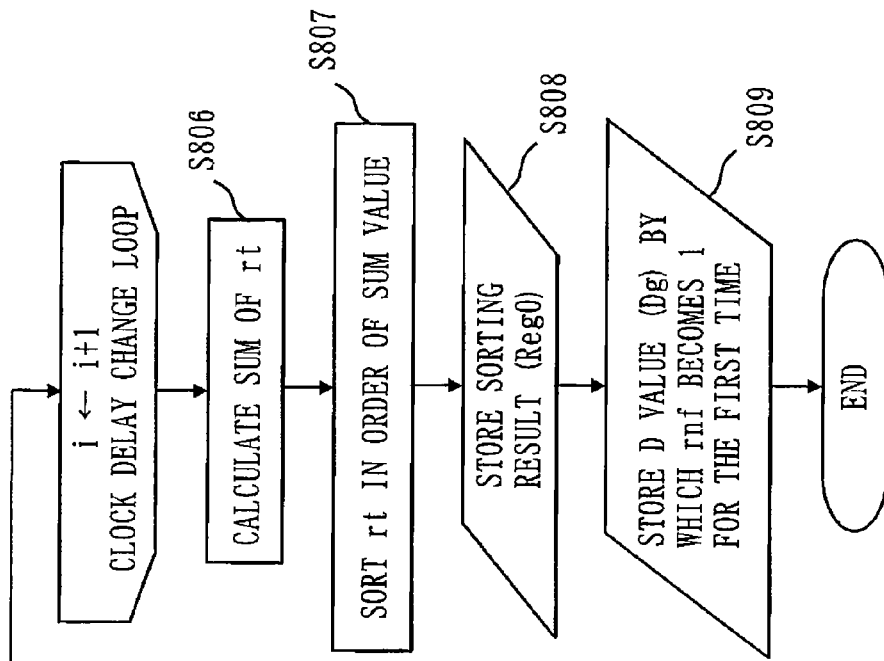
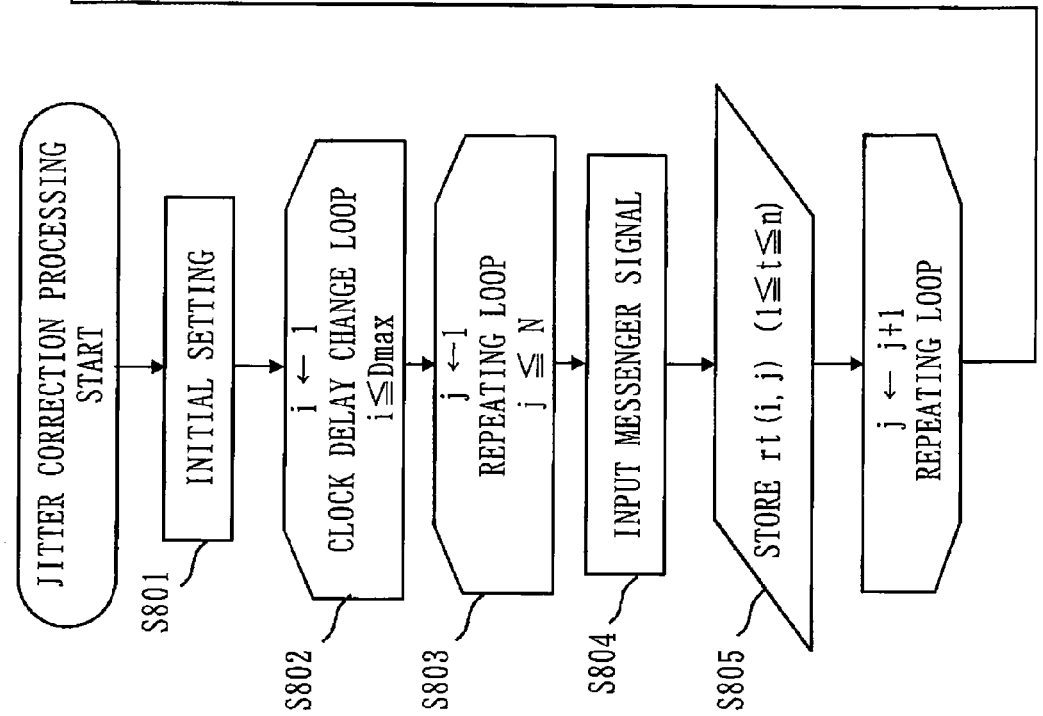

BIT SEQUENCE GENERATION APPARATUS AND BIT SEQUENCE GENERATION METHOD

TECHNICAL FIELD

The present invention relates to a security apparatus that performs authentication processing, encryption processing, etc. For example, the invention relates to an apparatus that generates secret information to be used in cryptographic processing and an apparatus-specific identifier to be required for authenticating the apparatus, based on a physical quantity unique to the apparatus.

BACKGROUND ART

In recent years, with the networking of embedded devices typified by mobile phones, there is an increasing need for them to perform processing relating to information security in order to keep secrecy of data dealt with by an embedded device, to maintain data integrity, and to authenticate the embedded device itself. The processing relating to information security is realized by encryption algorithms and authentication algorithms.

In this case, the basic premise for performing the algorithms is that each embedded device "securely" holds unique secret information and a device-specific identifier (these information are hereafter called "key information"). The term "securely" as used herein indicates that it is difficult for persons other than valid user of the device to read key information or perform tampering.

As a means to securely hold key information, there is a protection method that uses a tamper-resistant mechanism, such as a security chip and a case preventing a fraudulent access from the outside by a physical protective film (metal case, resin mold), while mounting various sensors (optical sensor, voltage sensor, frequency detector). The protection method is a means based on the premise of protecting the key information existing as digital data in a non-volatile manner in the device.

As another method whose approach to securely holding key information is different from that of the means described above, there is a technique referred to as a PUF (Physical Unclonable Function). A large feature of the PUF is that key information is not maintained as digital data in a non-volatile manner in the device. Although there exist some embodiments of the PUF, the conventional technique will be described referring to "Signal Generator Based Device Security" having high general versatility, disclosed in Patent Literature 1, as a representative example.

FIG. 19 shows an embodiment of the PUF according to Patent Literature 1. A bit generator 100 includes ring oscillators 101 composed of N ring oscillators 102 (R0 to RN), a selection circuit 104, and a frequency comparator 107.

The bit generator 100 uses a frequency characteristic of each ring oscillator 102, as an information source of key information. Output signals 103 of the ring oscillators are oscillated by the frequencies each determined based on a delay characteristic of the feedback circuit configuring each ring oscillator. The selection circuit 104 outputs two signals 106 (Si, Sj), as a pair, out of N output signals 103 of the ring oscillators, according to values of selection signals 105 (I, J). Next, oscillation frequencies of Si and Sj are compared in the frequency comparator 107. Then, the frequency comparator 107 outputs a comparison result 108. When expressing the oscillation frequencies of Si and Sj, respectively, as Fi and Fj, a method of using their difference value Fi-Fj as the comparison result 108 can be shown as an example. Finally the bit generator 100 outputs the comparison result 108 and a response bit value 109 indicating whether the comparison result 108 is positive or negative.

In the embodiment of the Patent Literature 1, since oscillation frequencies of the ring oscillators are different from each other depending on variation of the delay characteristic of devices, even if the bit generators 100 are manufactured based on the same design information, response bit values that vary from device to device are output. It is asserted in Patent Literature 1 that, according to the above described, response bit values can be used as identifiers of respective devices, and since the identifiers are not stored as digital data in a non-volatile manner but generated every time the bit generator is operated, they have tamper resistance higher than before.

CITATION LIST

Patent Literature

Patent Literature 1: Japanese Unexamined Patent Application Publication JP 2009-524998

Non Patent Literature

Non Patent Literature 1: Altera, "Design Guidelines for HardCopy Series Devices," 2008
Non Patent Literature 2: Altera, "Design Recommendations for Altera Devices and the Quartus II Design Assistant," 2009

SUMMARY OF INVENTION

Technical Problem

There are two problems in the realization of the PUF by using ring oscillators according to Patent Literature 1.

One is related to restrictions to alignment and wiring at the implementation time and security of the response bit values. It is described in Patent Literature 1 that each of the ring oscillators has the same design configuration (loop circuit with five inverters). However, as to a device with a low degree of freedom of alignment and wiring, such as an FPGA, even if the ring oscillators have the same design, their frequencies are sometimes greatly different from each other depending upon the alignment and wiring. In that case, the difference due to alignment and wiring may dominate the difference due to differences among the devices. Consequently, when a pair of ring oscillators having a large difference between their oscillation frequencies due to alignment and wiring is selected, the same response bit values are always output without depending on the device. When a large number of such bit values are included, the randomness of the response bit values becomes low, thereby posing a security problem. As solution to this problem, it is possible to think of an approach that manually performs alignment and wiring so that oscillation frequencies of N ring oscillators may not be much different from each other, but, however, it may be very difficult when N is large. Alternatively, it can also be considered that the number of ring oscillators to be implemented is increased beforehand in order to perform automatic alignment and wiring, and response bits are generated by using only pairs of ring oscillators whose oscillation frequencies are close to each other by chance. In this case, however, it is difficult to provide design assurance for the magnitude of N, and ring oscillators and the scale of the selection circuit increase.

The second problem is that the combinational loop circuit such as a ring oscillator has a structure not recommendable from a viewpoint of design rules for devices such as an FPGA (Field Programmable Gate Array). For example, in Non-patent Literature 1, it is pointed out that inputs/outputs of inverters composing a ring oscillator enter an intermediate potential state depending on design, and thus the inverters may fail to oscillate. Generally, a penetration current may flow steadily in the intermediate potential state, and thus a risk exists that the device reliability will be impaired. Similarly, also in Non-patent Literature 2, there is described that combinational loop circuits are not recommended.

The present invention has been made in view of the above technical problems and has as an object to provide a PUF circuit that can generate highly randomized secret information even in a device with a low degree of freedom of alignment and wiring and that does not cause violation of the design rules.

Solution to Problem

A bit sequence generation apparatus according to the present invention includes a glitch generating unit that generates a glitch, a glitch waveform acquisition unit that acquires a waveform of the glitch generated by the glitch generating unit, a bit data generating unit that generates 1-bit data indicating either one of 1 and 0, based on the waveform of the glitch acquired by the glitch waveform acquisition unit, and a bit sequence generating unit that generates a bit sequence composed of a plurality of the 1-bit data generated by the bit data generating unit.

Advantageous Effects of Invention

According to the present invention, it is possible to provide a PUF circuit that can generate highly randomized secret information even in a device with a low degree of freedom of alignment and wiring and that does not violate the design rules.

BRIEF DESCRIPTION OF DRAWINGS

FIG. 12 shows an implementation evaluation result of the bit sequence generation apparatus 200, according to Embodiment 1;

FIG. 16 is a flowchart showing operations of jitter correction processing by the bit sequence generation apparatus 200, according to Embodiment 1;

DESCRIPTION OF EMBODIMENTS

Embodiment 1

Referring to FIGS. 1 to 18, a bit sequence generation apparatus 200 according to Embodiment 1 will now be described. The bit sequence generation apparatus 200 of Embodiment 1 employs a method of constructing a PUF by exploiting glitch shapes.

Figure 1:
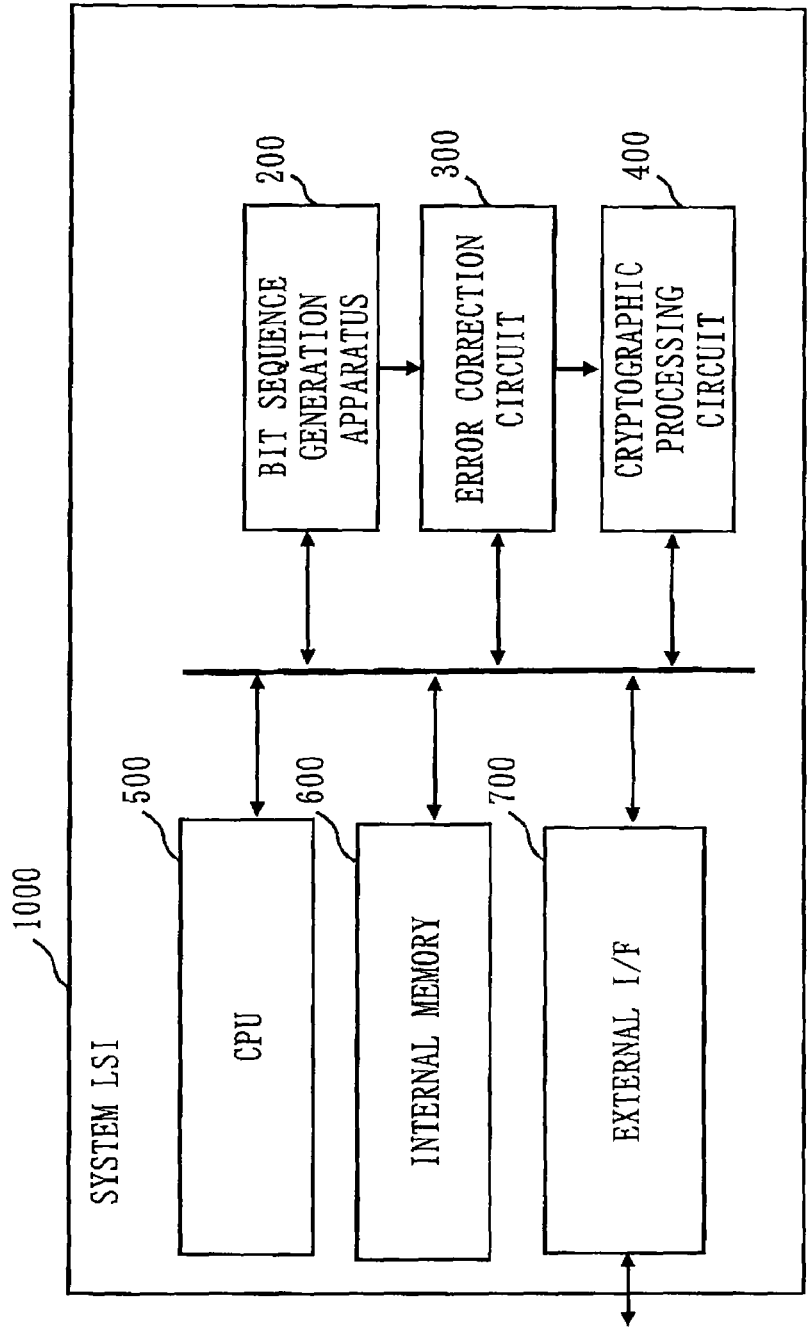
FIG. 1 shows an example of a bit sequence generation apparatus 200 installed in a system LSI, according to Embodiment 1.

FIG. 1 shows an example of the bit sequence generation apparatus 200 installed in a system LSI (Large Scale Integration) 1000. This example shows the bit sequence generation apparatus 200, an error correction circuit 300 (error correction unit) and a cryptographic processing circuit 400 installed in the general structured system LSI including a CPU (Central Processing Unit) 500, an internal memory 600, an external interface 700, etc. As will be described below, the bit sequence generation apparatus 200 generates key information, being bit sequences, from generated glitches. This key information is a glitch PUF. The data (bit sequences) generated by the bit sequence generation apparatus 200 are used as key information required in information security processing, such as cryptographic processing by the cryptographic processing circuit 400. Controlling the bit sequence generation apparatus 200 may be performed from the CPU 500.

First, the outline of the bit sequence generation apparatus 200 (glitch PUF to be described later) will be explained in "1.1 Basic Idea" to "3.1 Implementation Evaluation Result." Then later, its configuration and operations will be described in detail.

(1.1 Basic Idea)

Let us now examine the case of inputting, at an early design stage of a logic circuit, characteristics unique to a device, and simulating behavior of the device according to the characteristics The purpose of this simulation is to estimate the amount of information of a PUF to be implemented, taking account of differences among devices, and to configure an environment in which the amount of information (especially, its lower limit) can be estimated without evaluating a large amount of manufactured LSIs. As mentioned above, the amount of characteristic that has the greatest affinity for the simulation at early design stage is delay information. If a circuit is configured as such that differences of delay information among devices are directly connected to variation of the response of a PUF, there is a possibility that the amount of information of the PUF can be evaluated in the scope of the current logic circuit design flow. Now, consider a difference in circuit behavior that may occur in the case of the same logic circuits with different delay information.

Figure 2:
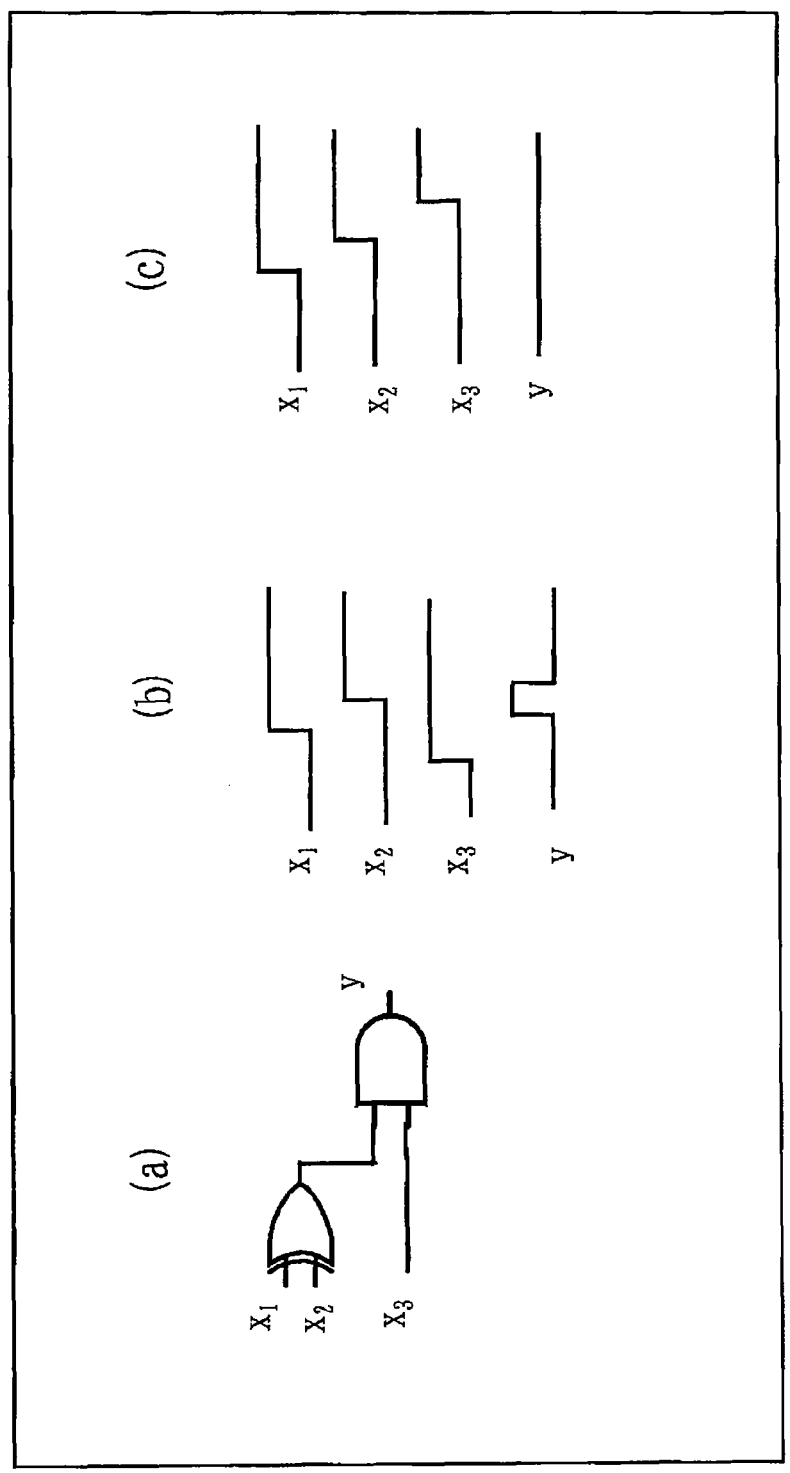
FIG. 2 shows examples of circuit behaviors that may occur in the case of the same logic circuits with different delay information, according to Embodiment 1.

FIG. 2 shows examples of circuit behaviors that may occur in the case of the same logic circuits with different delay information. For example, as (a) of FIG. 2, provided is a circuit which performs logical operations, such as AND and XOR, in response to a plurality of inputs. In this type of circuit, a transition of a signal, called a glitch, occurs due to the delay difference between signals unless a particular condition is satisfied. In the example of FIG. 2, when all of the input signals x1, x2, and x3 change from 0 to 1, a convex glitch occurs at the XOR gate output depending on the difference of signal change between the input signals x1 and x2. As shown in (b) of FIG. 2, if the change of the input signal x3 reaches the AND gate previously to the glitch, the glitch propagates to the output of the AND gate. On the contrary, as shown in (c) of FIG. 2, if the input signal x3 reaches after the glitch, the glitch does not propagate to the output of the AND gate, and thus the output remains unchanged. Furthermore, even if x3 reaches previously, there is a case in which the signal change does not propagate to the output when the glitch width is narrow. Then, if limited to glitch waveforms with a sufficient width, the shapes of the glitch waveforms are determined based on a relative relation of delay values between signals, not based on the absolute amount of delay at each gate. That is, shapes of glitches can be expected to be unchanged even if the operating environment changes.

Focusing on glitches which can take various shapes according to the relation of delay between input signals of each gate constituting a logic circuit, the inventor has devised a method of applying the glitches to construct a PUF. This construction method is sometimes called a "Glitch PUF" hereinafter.

(1.2 Acquisition of Glitch Shapes)

As described above, the inventor attempted to construct a PUF by using glitches which can take various shapes according to variation in delay. The problem here is how to accurately acquire the shape of a pulse signal like a glitch that occurs only for a very short period of time. Regarding this, the acquisition processing needs to be realized as a digital circuit.

(Phase-Shift Method)

As a general solution to this problem, sampling glitch waveforms by a phase-shift method can be proposed. A plurality of clock signals with shifted phases are prepared to sample a micro pulse by using the clocks. For further heightening the sampling accuracy, it is necessary to prepare clocks with different phases, as many as possible. In that case, since too many number of clock lines is needed, this method is not practical. Particularly in FPGA, the number of global clock lines with little jitter is limited to be from several to several dozen. Although there can be a method of reducing the number of clock lines by regenerating the glitch waveforms and performing sampling processing by time-division processing, the extraction speed will decrease in proportion to the number of division.

Then, the inventor adopts a processing method of shifting sampling target data by a very short period of time and performing sampling by using the same clock.

Figure 3:
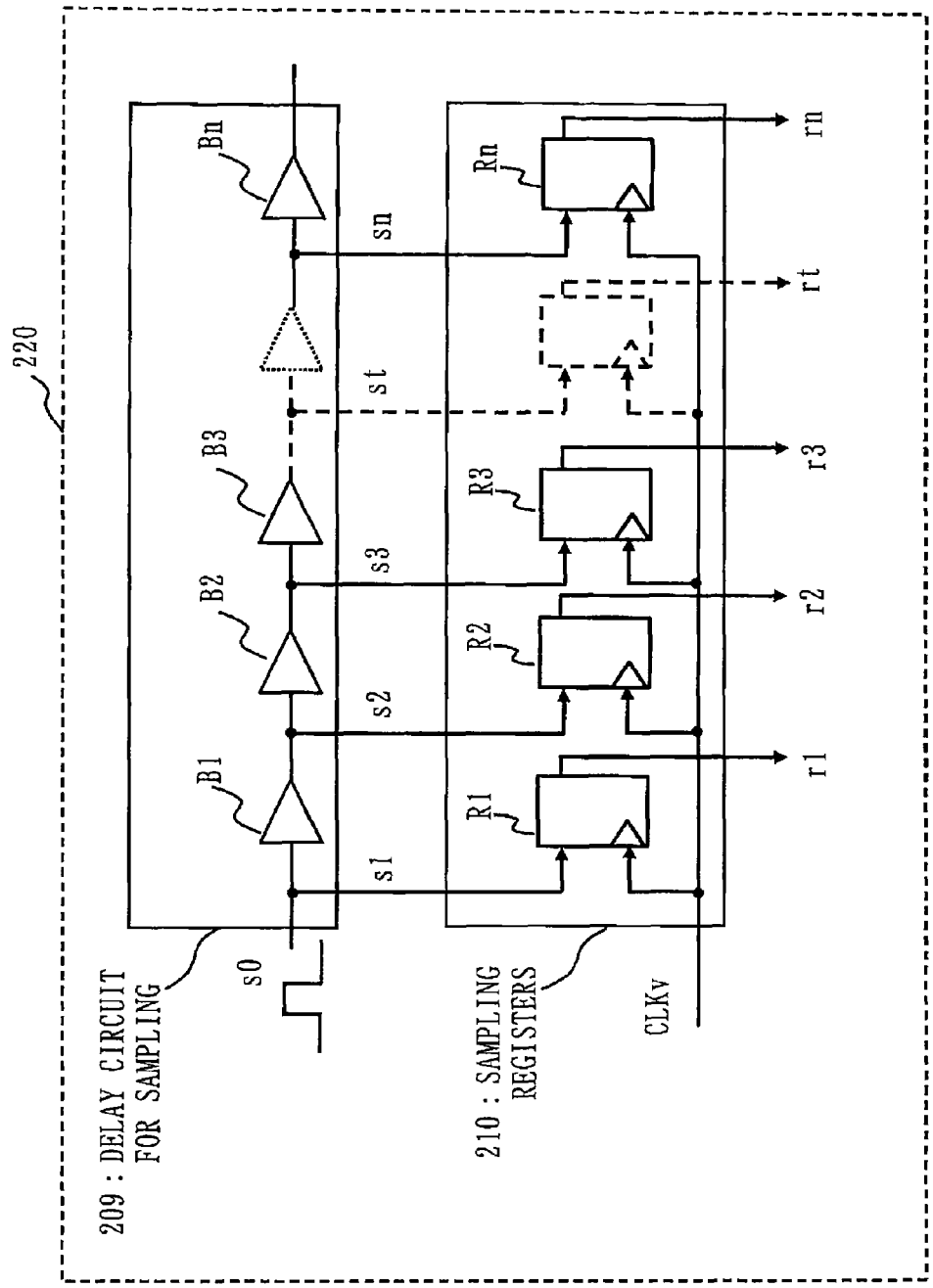
FIG. 3 shows a structure of a sampling circuit 220, according to Embodiment 1.
Figure 4:
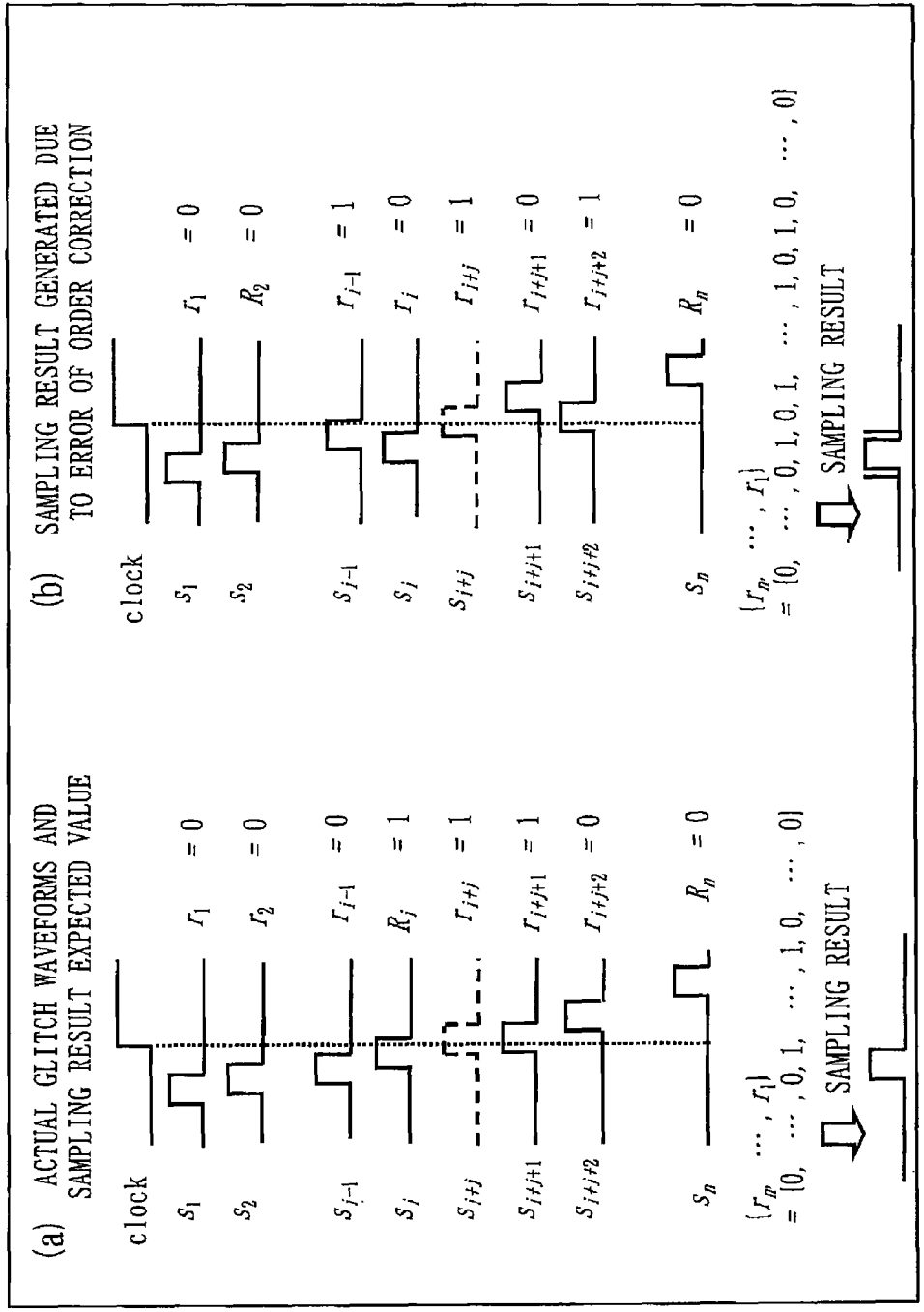
FIG. 4 shows an expected value of a sampling result and a sampling result that may occur, according to Embodiment 1.

FIG. 3 shows a structure of a sampling circuit 220 employing this method. This sampling processing will hereafter be called "glitch acquisition processing" (also called glitch shape acquisition processing). In this sampling method, the sampling interval needs to be short in order to perform accurate shape acquisition. Therefore, it is necessary to reduce the delay difference between signals input into flip-flops (hereafter FFs) as much as possible by reducing the number of stages (B1 to Bn) of the buffer, each inserted between the signals input into respective flip-flops (registers R1 to Rn) in FIG. 3, or by using elements with smaller delay values. However, in proportion as the delay difference between signals decreases, the order relations of the sampling positions and delays of the FFs do not correspond with each other as shown in FIG. 4 due to influences of clock jitters between the FFs, variation in wire delay and gate delay, etc. Therefore, permutation occurs in the time order relation of sampled data. That is, it will probably be impossible to accurately restore the glitch shapes. In addition, this problem also occurs in the above-described phase-shifting of clocks.

FIG. 4 shows "actual glitch waveforms and an expected value of the sampling result" ((a) of FIG. 4), and "a sampling result generated due to errors of the order correction" ((b) of FIG. 4). That is, as shown in (b) of FIG. 4, since permutation occurs in the time order relation of the sampled data, it will probably be impossible to accurately restore the glitch shapes.

(Jitter Correction Processing)

Then, the inventor executes "preprocessing" shown below before performing glitch acquisition processing. The time order relation of the sampling result is determined by performing the "preprocessing." This "preprocessing" will be called "jitter correction processing" (mentioned later in S701). The outline of the "jitter correction processing" is described below.

(1) First, apart from a signal that generates glitches, there is prepared a signal line to generate a simple rising signal. This signal will be called a messenger signal (messenger signal (h) to be described later).

(2) Then, the messenger signal is input to the sampling circuit 220 of FIG. 3 to perform sampling. In this case, each FF (R1 to Rn) of the sampling circuit 220 latches 1 when the messenger signal reaches before the rise of the clock, and 0 when the messenger signal reaches after the rise of the clock. This processing is performed a plurality of times while changing a delay value of the delay circuit (variable delay circuit 207 described later) in the clock line, where the delay value is variable, and the number of times of latching 1 is counted for each FF.

(3) Lastly, the time order relation of the sampling by each FF is calculated based on the magnitude of the number of times. By using this order relation, the glitch shape is restored by performing permutation of the sampling result of the glitch waveform.

Figure 5:
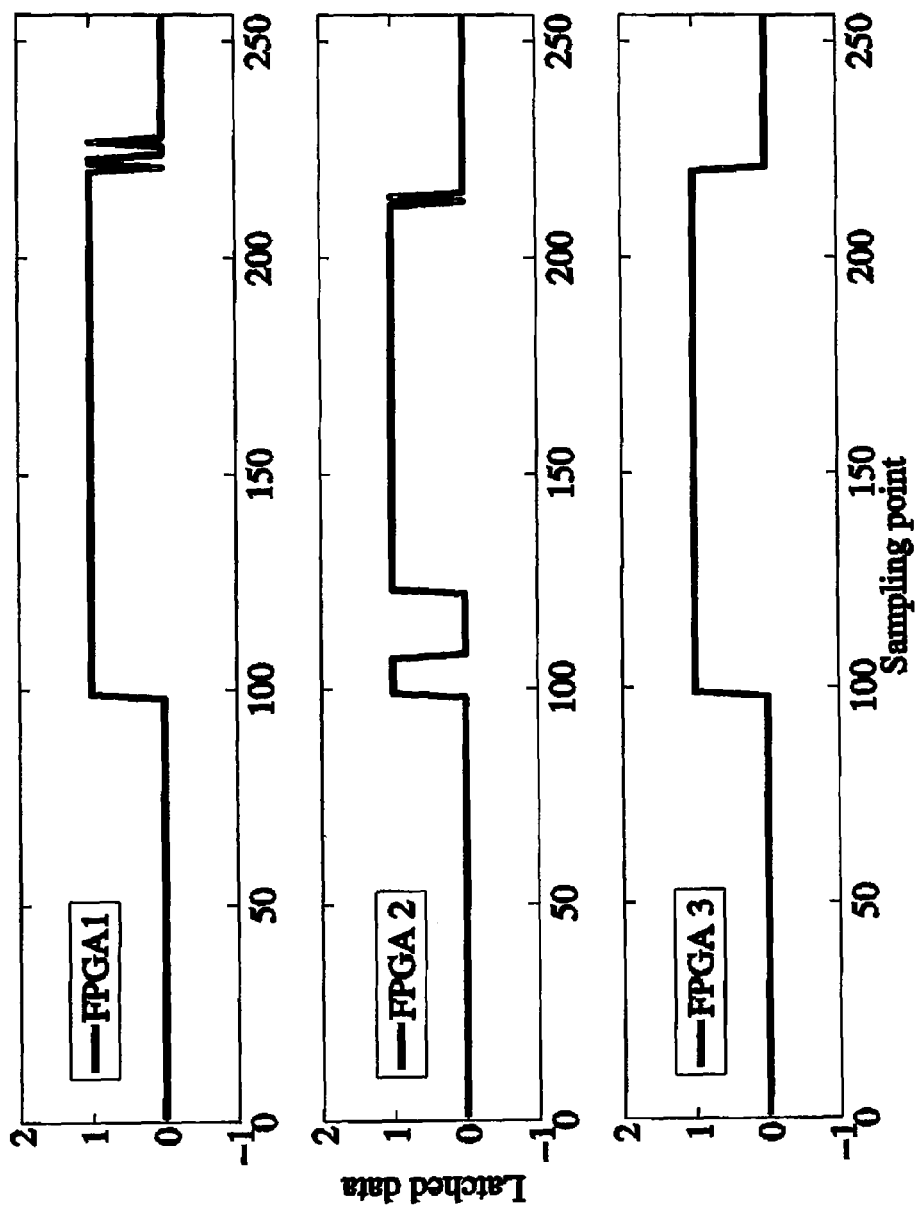
FIG. 5 shows acquisition results of glitch acquisition processing performed by utilizing jitter correction processing, according to Embodiment 1.
Figure 6:
FIG. 6 shows acquisition results without performing jitter correction processing, according to Embodiment 1.

By using the result of the "jitter correction processing," permutation is performed for the result of the "glitch acquisition processing." This permutation processing will now be called "sorting processing" (S708 to be described later). FIG. 5 shows acquisition results of glitch acquisition processing performed by utilizing jitter correction processing. FIG. 6 shows acquisition results without performing jitter correction processing.

(1.3 Converting Glitch Shape to Bit Value)

The glitch shape acquired as digital data by the above described sampling method is converted into a 1-bit value. Here, a method of converting the parity of the rising edge in a glitch shape into a bit value will be described. The parity check of the rising edge can be detected by implementing differential processing and additional processing in hardware or software. This processing will be called "shape determination processing" (mentioned later in S709).

However, it is still difficult to completely correct the time order relation of the FFs even though the above-described preprocessing (jitter correction processing) is performed. If the order relation between FFs computed by the preprocessing differs from the actual behavior of the circuit, a glitch as shown in (b) of FIG. 4 is acquired such that glitches, each having a narrow pulse width, are continuously generated apparently near the edge of the glitch waveform. Since this type of phenomenon is an unstable behavior occurring when the time order relation between FFs is close, results of edge detection can be different for each glitch acquisition. In addition, the same phenomenon may also occur when a pulse width of an actually generated glitch is extremely narrow.

(Filtering Processing)

Figure 7:
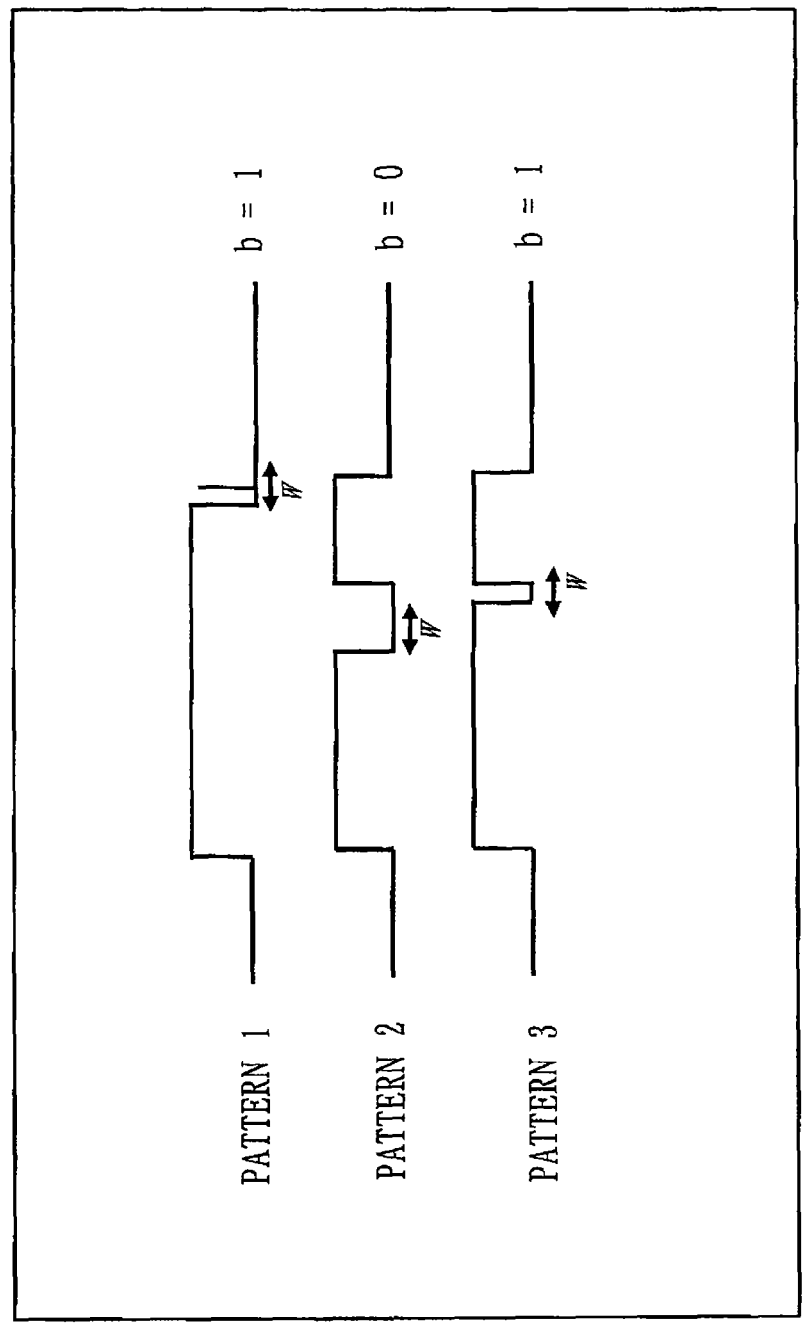
FIG. 7 shows examples of acquired glitch patterns, according to Embodiment 1.

Then, the inventor decided to perform processing of ignoring pulses, before checking the parity of the edge, when the pulse width of an acquired glitch shape as shown in FIG. 7 is less than or equal to a threshold value w. This processing will be described as "filtering processing" below. FIG. 7 shows three examples of acquired glitch patterns.

(1.4 Improvement of Error Rate)

In order to improve the error rate of results of the shape determination processing, utilizing the feature that the same processing can be repeatedly performed, shape determination is repeatedly performed for glitches generated by a state change of the same input register, and then, the final output is determined by majority processing. Particularly, at "the time of initial key generation," only the inputs whose outputs all become the same in response to M-times repeated processing are used for key generation. "The time of initial key generation" is a time when key information (bit sequence) is initially generated by the bit sequence generation apparatus 200 installed in the system LSI 1000. For example, it is the time when key information is initially generated in the LSI at factory shipment. In this case, the determination processing is performed M-times for each of N state changes to generate an N-bit response, and simultaneously generate an N-bit mask value. The bit of 1 of the mask value indicates a bit to be used for key generation, and the bit of 0 indicates not to be used for key generation. The mask value is output outside as a part of Helper Data. The "Improvement of Error Rate" will be described in detail later after the explanation of "i and j in FIG. 15."

When performing the mask processing, the amount of information is reduced compared with the case of performing no mask processing. However, since the Glitch PUF has a feature that a bit position with a high error rate is depending on the apparatus itself and its bit amount is small, the implementation rate of key generation increases more when the correction ability of an error correction code is reduced.

(2.1 Structure of Glitch PUF)

Figure 8:
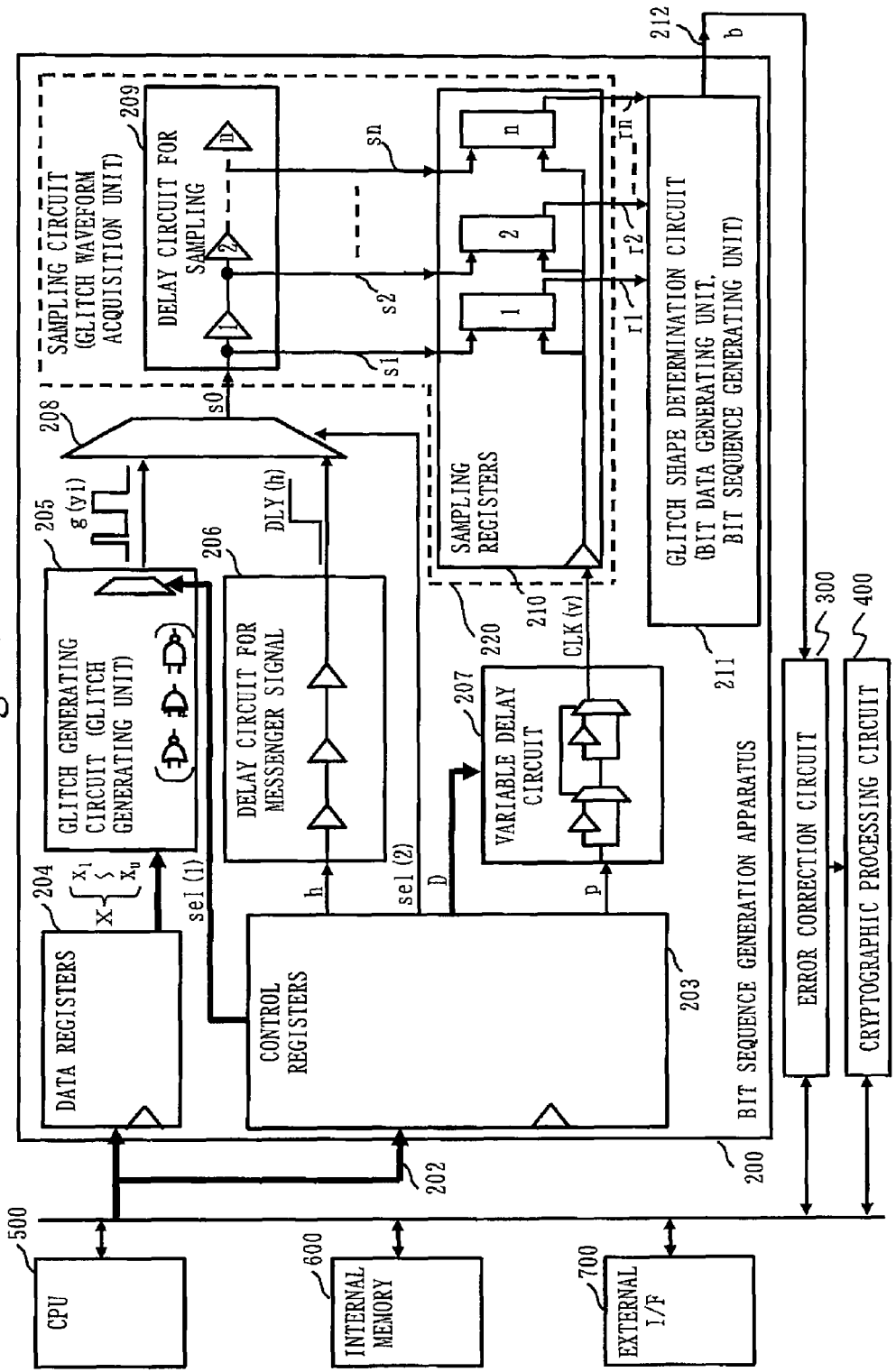
FIG. 8 shows a circuit structure of the bit sequence generation apparatus 200, according to Embodiment 1.

FIG. 8 shows a circuit structure of the bit sequence generation apparatus 200 that implements the Glitch PUF. The bit sequence generation apparatus 200 is mainly composed of control registers 203, data registers 204, a glitch generating circuit 205, the sampling circuit 220, and two types of delay circuits (a delay circuit 206 for messenger signals, the variable delay circuit 207).

(1) The control registers 203 store the flowing parameters for controlling:

Control signal Sel (1): selection signal (log u bits) of a glitch generating circuit,
Control signal sel (2): input selection signal (one bit) of a sampling circuit,
Messenger signal (h): (one bit),
Control signal (D): delay value designating signal (q+q' bits) of a variable delay circuit,
Control signal (p): trigger signal (one bit)

(2) The data registers 204 store data X (u bits) to be input into the glitch generating circuit 205.

Figure 9:
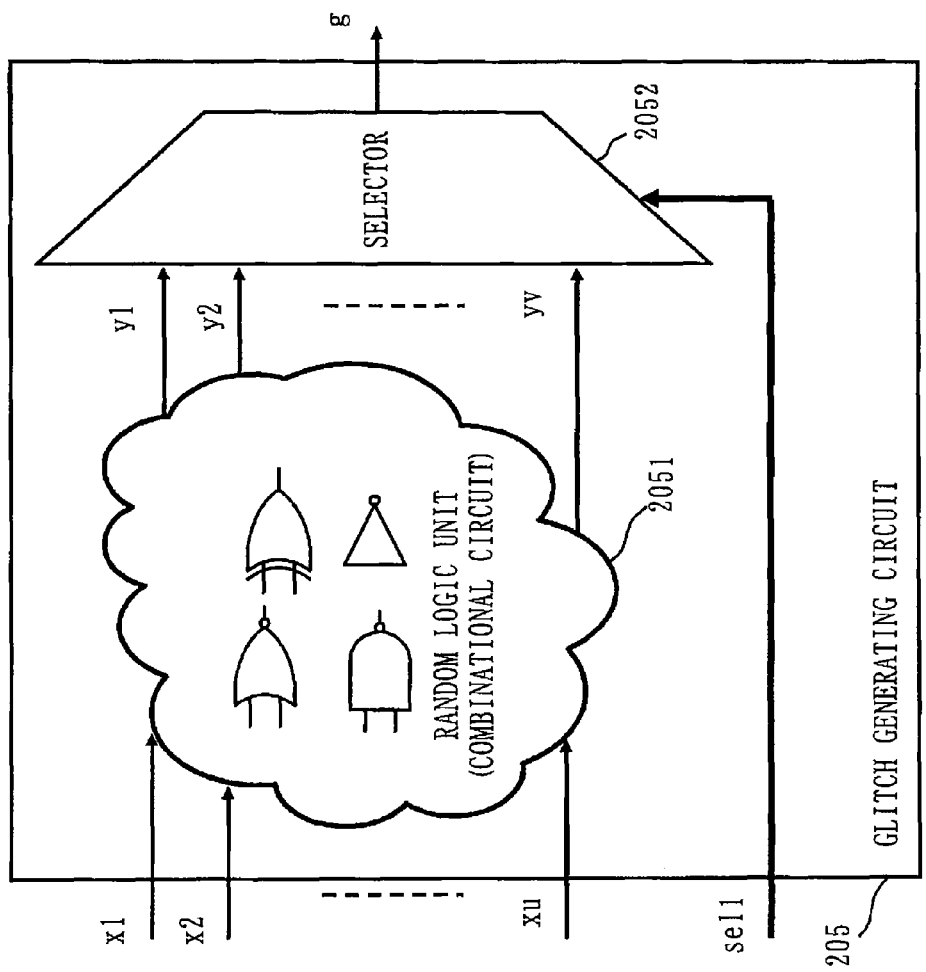
FIG. 9 shows a structure example of a glitch generating circuit 205, according to Embodiment 1.

(3) FIG. 9 shows a structure of the glitch generating circuit 205. As shown in FIG. 9, the glitch generating circuit 205 is composed of a combinational circuit (random logic unit 2051) that performs a logical operation Y=f(X) defined for input data X, and a v-1 selector 2052 that selects one bit from Y of v bits, based on a selection signal Sel (1), and outputs the one bit.

(4) The delay circuit 206 for messenger signals is composed, for example, of a buffer chain, and outputs DLY(h) being a delay signal $h_d$ of the messenger signal (h). The number of stages of the buffer chain is determined at the design stage by simulation estimating the occurrence timing of glitch signals generated in the glitch generating circuit 205. Details on this will be described later.

Figure 10:
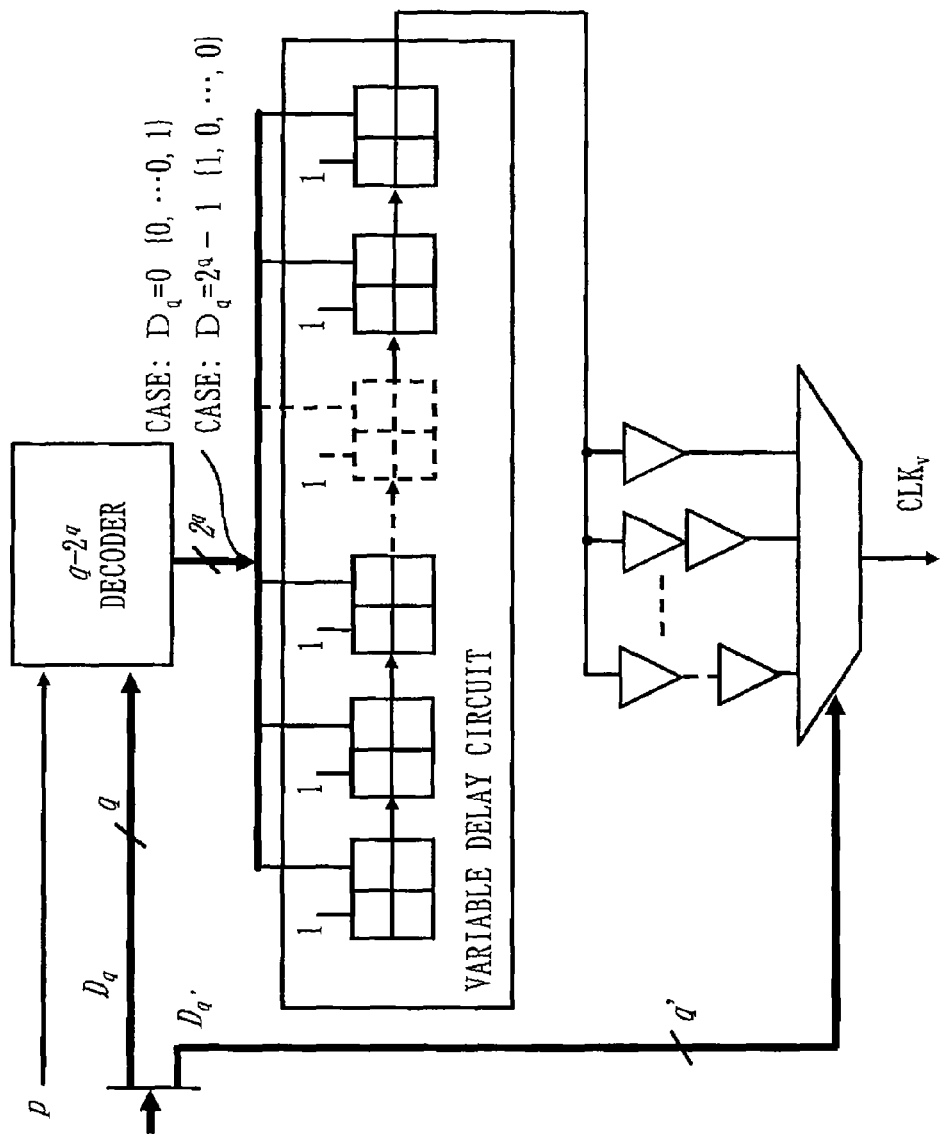
FIG. 10 shows a structure example of a delay circuit in which a carry path delay circuit and an LUT delay circuit are combined, according to Embodiment 1.

(5) The sampling circuit 220 is composed of a buffer chain (a delay circuit 209 for sampling) and FFs (sampling registers 210) as shown in FIG. 3. When assuming that a Glitch PUF is implemented on an FPGA, the sampling resolution can be increased higher by utilizing carry paths of adder circuits as a buffer chain in the sampling circuit 220 than by implementing buffers in Look-up Tables (LUTs). Moreover, carry paths are also used for the variable delay circuit 207 in order to make the variable step size of the delay value small. However, since the variable range of the variable delay circuit 207 needs to be larger than the sampling range, the circuit scale increases if all are implemented by carry paths. Thus, as shown in FIG. 10, securing a large operation range without decreasing the resolution can be achieved by combining a delay circuit based on a carry path and a delay circuit based on an LUT. FIG. 10 shows the structure of a delay circuit in which the carry path delay circuit and the LUT delay circuit are combined.

With respect to the Glitch PUF according to Embodiment 1, the process until the sampling (sampling circuit 220) is implemented by hardware, and the process after that is implemented by firmware in order to observe the behavior of generated glitches.

(2.2 Adjustment of Design Parameters)

To efficiently realize shape acquisition of glitches, it is necessary to adjust parameters of each circuit at the design stage. The parameters to be adjusted are as follows:

n: The number of FFs in the sampling circuit 220,
$delay_s$: The delay value of a buffer inserted between signals of the sampling circuit 220,
$range_s$: The sampling range of the sampling circuit 220,
$range_g$: The glitch occurrence range in the glitch generating circuit 205,
$range_{CLK}$: The variable range of the variable delay circuit 207,
$t_g$: The time of the central value in the glitch occurrence range,
$t_h$: The rising time of the delay signal $h_d$ (DLY (h)) of the messenger signal (h)

Figure 11:
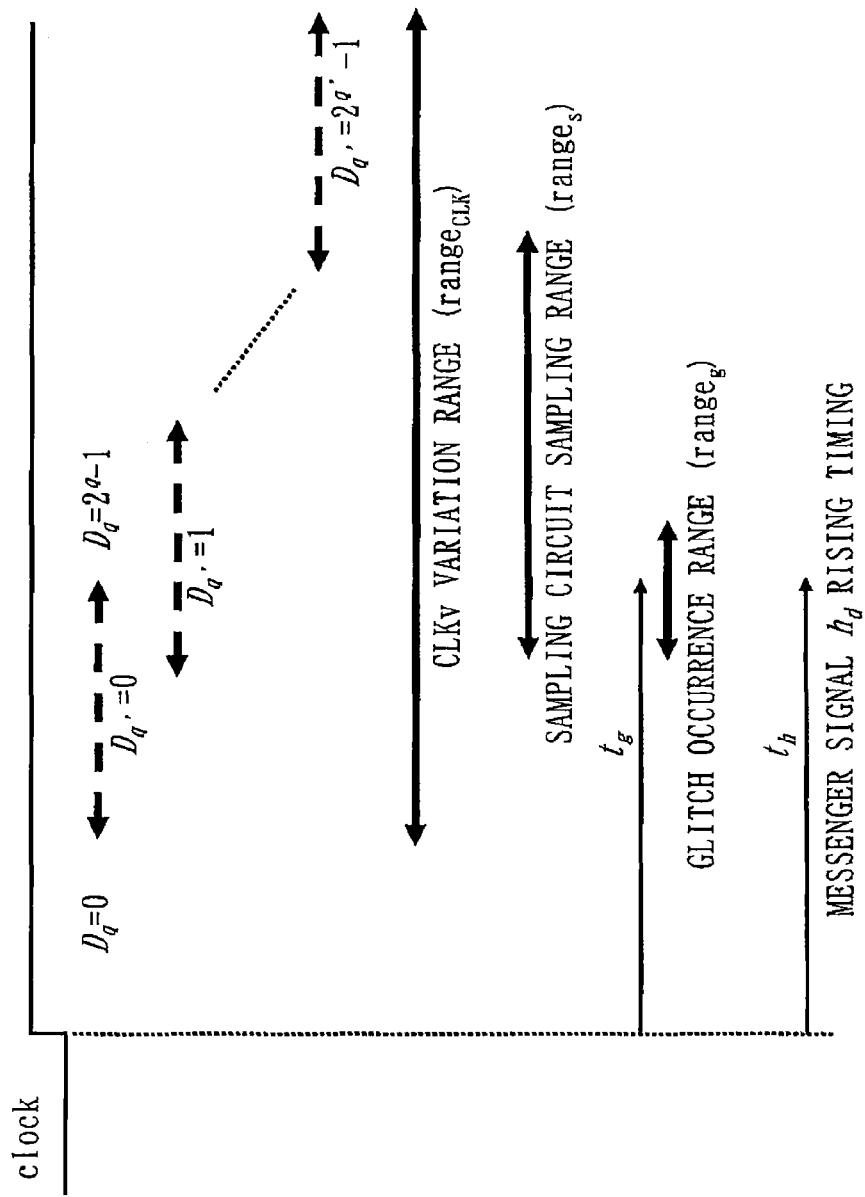
FIG. 11 shows a relationship of respective parameters, according to Embodiment 1.

FIG. 11 shows the relationship of the respective parameters. n and $delay_s$ are parameters related to the sampling range and its resolution. The sampling range $range_s$ is approximately $n \cdot delay_s$. That is, $range_s \approx n \cdot delay_s$.

In order to acquire glitch shapes, it needs to be $range_g < range_s < range_{mx}$. A design procedure to realize the relation will be described below.

(1) First, when the logic of the glitch generating circuit 205 is determined, the time range $range_g$ and the occurring timing $t_g$ of glitch occurrence at the input of the sampling circuit 220 are estimated by logic simulation with delay information.

(2) Next, n and $delay_s$ are determined such that $range_g < range_s$ is satisfied. At this point, the resolution of sampling can be heightened by using a cell, as a buffer, such that the $delay_s$ is as small as possible on the implementation target platform. Thus, it is n that is actually to be determined. In the implementation of Embodiment 1, the $range_s$ is set to be more than twice the $range_g$ as a design margin. Moreover, similarly, the number of stages of the buffer in the variable delay circuit is set such that $range_{CLK}$ is around twice the $range_s$.

(3) Next, the number of stages of the buffer in the delay circuit for messenger signals is determined. At this time, the delay value of the delay circuit is designed to be $t_g \approx t_h$ by using the above estimated result $t_g$. The reason for performing a timing adjustment for the messenger signal is to use for calculating the time order relation of sampling results, and simultaneously, to determine the value Dg of a delay value designating signal in the variable delay circuit used when acquiring glitch shapes.

The method for this is described below.

In calculating the time order relation of sampling results, sampling is performed while incrementing D from the minimum value to the maximum value for the messenger signal. Here, the value of D when an FF around the center of the sampling results latches 1 for the first time shall be Dg. Since the glitch occurrence range has been adjusted to be around the same as the delay of the messenger signal, glitch waveforms can be sampled around the center of the sampling range. However, since it is generally difficult to accurately adjust the delay between signals, range, and $range_{cLK}$ need to be set having a margin, such as twice or half, as described above.

(3.1 Implementation Evaluation Result)

The circuit performance of an experimentally produced glitch PUF (bit sequence generation apparatus 200) is described below.

FIG. 12 shows an implementation evaluation result. The experimental production was performed using Spartan-3A evaluation boards by AVNET Inc. The target device is XC3S400A-4FT256. Moreover, the processing performed after the shape acquisition processing mentioned above is implemented by firmware processing using a MicroBlaze mounted on the same FPGA. As a glitch generating circuit 205, AES SubBytes circuit is used because its logic is complex and circuit structure is widely known to designers of cryptographic hardware. The sampling circuit 220 is implemented with 256 FFs, and the variable delay circuit 207 is configured by a 256-bit adder circuit and a buffer chain whose number of LUTs are 4, 8, 12 and 16 to be selected by a 4-1 selector.

The outline of the bit sequence generation apparatus 200 has been described above, and then, its detailed configuration and operations will be explained below.

Referring to FIG. 8, there is described the bit sequence generation apparatus 200 which generates bit sequences to be used as key information.

(Structure of Bit Sequence Generation Apparatus 200)

The bit sequence generation apparatus 200, connected to a data bus 202, includes the control registers 203, the data registers 204, the glitch generating circuit 205 (glitch generating unit), the circuit 206 for messenger signals (messenger signal delay unit), the variable delay circuit 207 (variable delay unit), a selector 208, the delay circuit 209 for sampling (glitch delay unit), the sampling registers 210 (sampling unit), a glitch shape determination circuit 211 (bit data generating unit, bit sequence generating unit), and a bit sequence output bus 212. The delay circuit 209 for sampling and the sampling registers 210 compose the sampling circuit 220 (glitch waveform acquisition unit). Each configuration element will be described below.

(Control Registers 203)

The control registers 203 are a plurality of registers each holding, with respect to data input from the data bus 202, a control signal sel (1) to the glitch generating circuit 205, a messenger signal (h) used when performing jitter correction processing described later, a control signal sel (2) to the selector 209, a control signal (D) for changing the delay value in the variable delay circuit 207, and a control signal (p) for inputting a clock to the sampling registers 210.

(Data Registers 204)

The data registers 204 are a plurality of registers each holding, with respect to data input from the data bus 202, an input signal X to the glitch generating circuit 205.

(Glitch Generating Circuit 205)

The glitch generating circuit 205 is a circuit that inputs data signals X from the data registers 204 and control signals sel (1) from the control registers 203, and outputs signals g. With reference to FIG. 9, the internal structure of the glitch generating circuit 205 will be explained. The random logic unit 2051 (combinational circuit) processes u-bit input of x1, ..., xu expressing X for each bit, by using the combinational circuit wherein arbitrary functions are combined, and outputs v-bit data of y1, yv. According to the control signal sel (1), the selector 2052 (glitch output selector) selects a 1-bit signal line from v signal lines of y1, ..., yv (they may be called bit signal lines), and outputs it as an output g. As a function processed in the random logic unit 2051, an S-box defined by DES can be cited as an example. In the case of this example, u=6 and v=4. Since the S-box is purely an example, it does not limit the structure of the random logic unit 2051.

(Delay Circuit 206 for Messenger Signals, Delay Circuit 209 for Sampling)

The delay circuit 206 for messenger signals and the delay circuit 209 for sampling are circuits that generate fixed signal delays.

Figure 13:
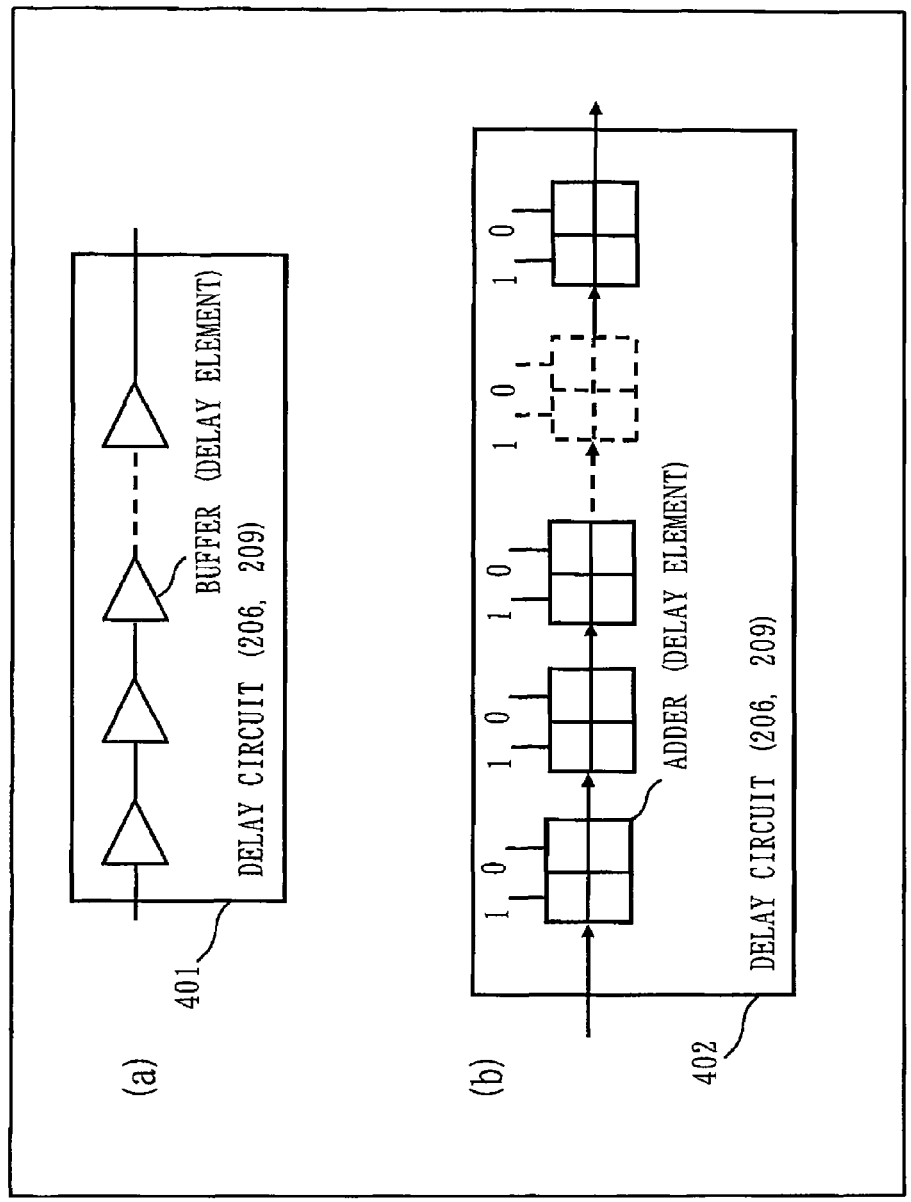
FIG. 13 shows an internal structure example of a delay circuit which is used as a delay circuit 206 for messenger signals or a delay circuit 209 for sampling, according to Embodiment 1.

FIG. 13 shows the internal structure of the delay circuit which is used as the delay circuit 206 for messenger signals or the delay circuit 209 for sampling, where a delay circuit 401 and a delay circuit 402 are employed as the circuit 206 or the circuit 209. The delay circuit 401 shown in (a) of FIG. 13 is a case configured by series connection of a general buffer circuit (an example of delay elements), and is generically used in the ASIC (Application Specific Integrated Circuit). On the other hand, the delay circuit 402 shown in (b) of FIG. 13 is a case configured by utilizing a carry propagation delay of the adder (an example of delay elements). In the FPGA, since the adder circuit is composed of dedicated hard macros, the carry propagation delay is faster than that of an LUT which constitutes a normal logic. For this reason, it becomes possible to provide finer granularity of delay by using the carry propagation delay as a delay circuit. The number of logical stages of the delay circuit 206 for messenger signals is designed to be about the same as that of the glitch generating circuit 205.

(Variable delay circuit 207)

Figure 14:
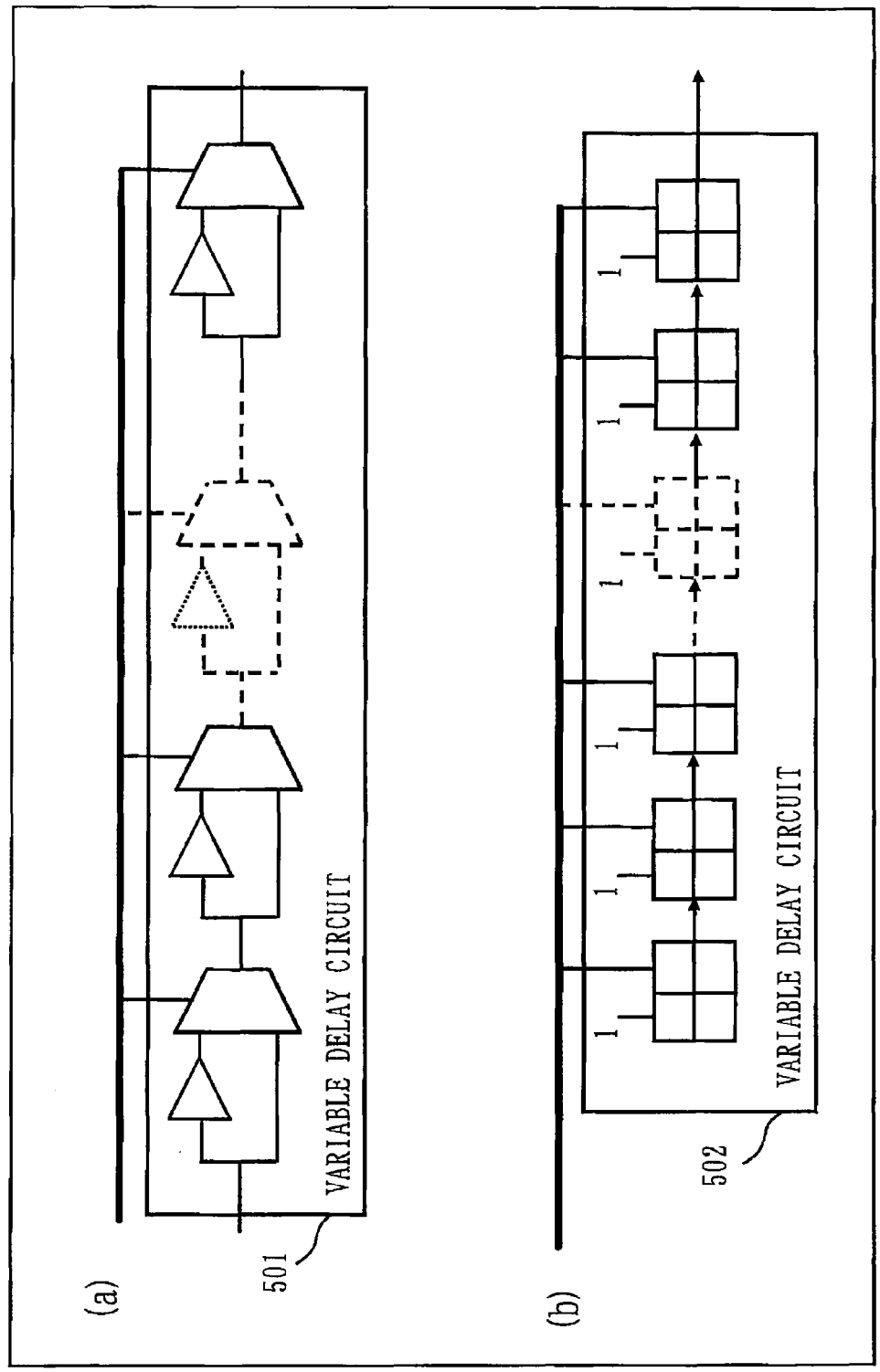
FIG. 14 shows an internal structure example of a variable delay circuit 207, according to Embodiment 1.

The variable delay circuit 207 is a delay circuit in which the delay from input to output is variable according to a control signal (D). FIG. 14 shows the internal structure of the variable delay circuit 207. A variable delay circuit 501 and a variable delay circuit 502 of FIG. 14 are used as the variable delay circuit 207.

The variable delay circuit 501 shown in (a) of FIG. 14 has a configuration in which the path is switched by the selector according to a control signal (D) for each of the stages of the buffer circuit connected in series. The variable delay circuit 502 shown in (b) of FIG. 14 has a configuration utilizing a carry propagation delay which occurs by adding the data generated by encoding the control signal (D) and the data of all ones (1s). For example, when a large delay value is needed in the variable delay circuit 502, a carry is propagated, from the low order, by performing an addition between "00 ... 01" and "all 1s", to output a carry signal generated in the highest order. When a small delay value is needed in the variable delay circuit 502, a carry generated in the high order by performing an addition between "100 . . . 0" and "all 1s" is output. The reason for using the adder circuit such as the variable delay circuit 502 as a delay circuit is, as described above, to make the granularity of delay fine in an LSI such as an FPGA. The variable range of the variable delay circuit 207 is designed to be alterable in the range including the minimum path delay (delay of s1) and the maximum path delay (sn) of the delay circuit 209 for sampling.

(Selector 208)

The selector 208 is a circuit which selects an output g of the glitch generating circuit 205 and an output DLY(h) of the delay circuit 206 for messenger signals according to a control signal sel (2). An output s0 of the selector 208 is connected to the delay circuit 209 for sampling.

(Sampling Registers 210)

With reference to FIG. 3, the configuration of the sampling registers 210 will be described. The sampling registers 210 are registers that latch outputs of the delay circuit 209 for sampling, using CLK(v)s being outputs of the variable delay circuit 207 as clock signals. The delay circuit 209 for sampling outputs signals s1 to sn whose number of stages of the delay element are different. The delay circuit 209 for sampling is connected to each register R composing the sampling registers 210. A register Ri inputs a signal si from the input signal line and a clock signal CLK(v) from the clock signal line, and outputs a signal ri from the output signal line.

(Glitch Shape Determination Circuit 211)

The glitch shape determination circuit 211 inputs n-bit signals r1, r2, . . . , rn output from the sampling registers 210, and performs jitter correction processing to be described later. Moreover, the glitch shape determination circuit 211 has a logic that converts n-bit data of rc1, rc2, . . . , rcn obtained based on glitches to 1-bit data b after the jitter correction processing.

(Explanation of Operations)

Figure 15:
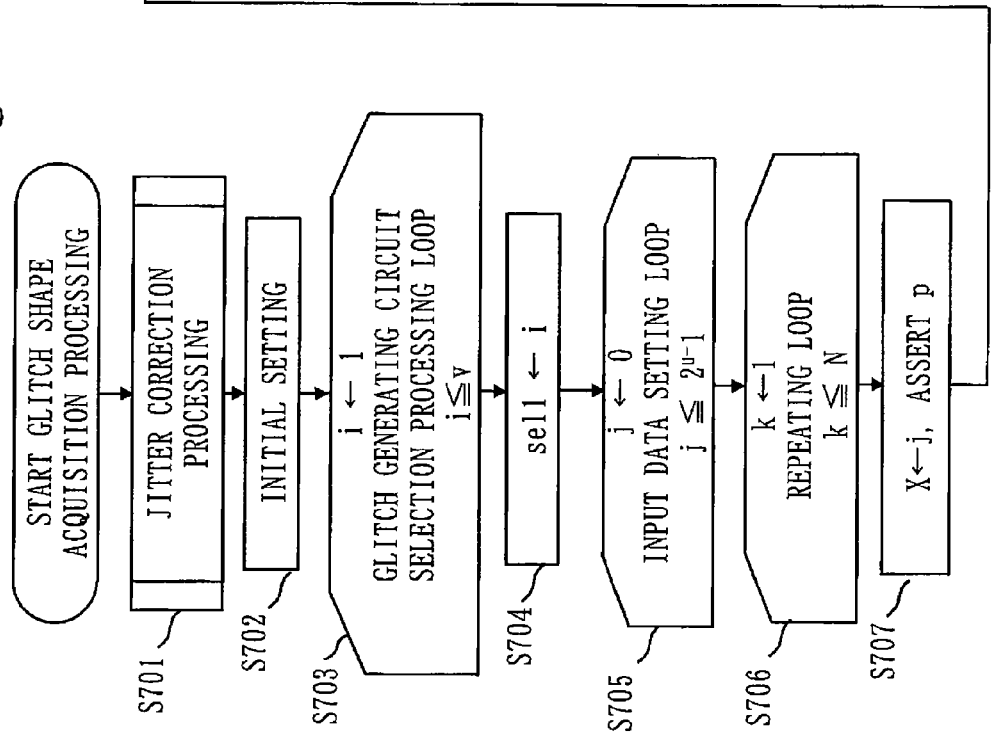
FIG. 15 is a flowchart showing operations of the bit sequence generation apparatus 200, according to Embodiment 1.

FIG. 15 is a flowchart showing operations of the bit sequence generation apparatus 200. Now, referring to FIG. 15, operations of the bit sequence generation apparatus 200 will be explained. The CPU 500 shall control the bit sequence generation apparatus 200 with respect to the operations of FIG. 15 and the operations, to be described below, of FIG. 16.

(Jitter Correction Processing)

First, the bit sequence generation apparatus 200 performs jitter correction processing (S701). FIG. 16 is a flowchart showing operations of the jitter correction processing by the bit sequence generation apparatus 200. Now, referring to FIG. 16, the jitter correction processing will be explained.

(1) In the initial setting of FIG. 16, the CPU 500 sets the control signal sel (2) as a signal value for selecting DLY (h) after initializing all the registers (S801).

(2) Then, the CPU 500 inputs a messenger signal (h) while repeating changing the control signal (D) to the variable delay circuit 207 (S802, S804).

Figure 17:
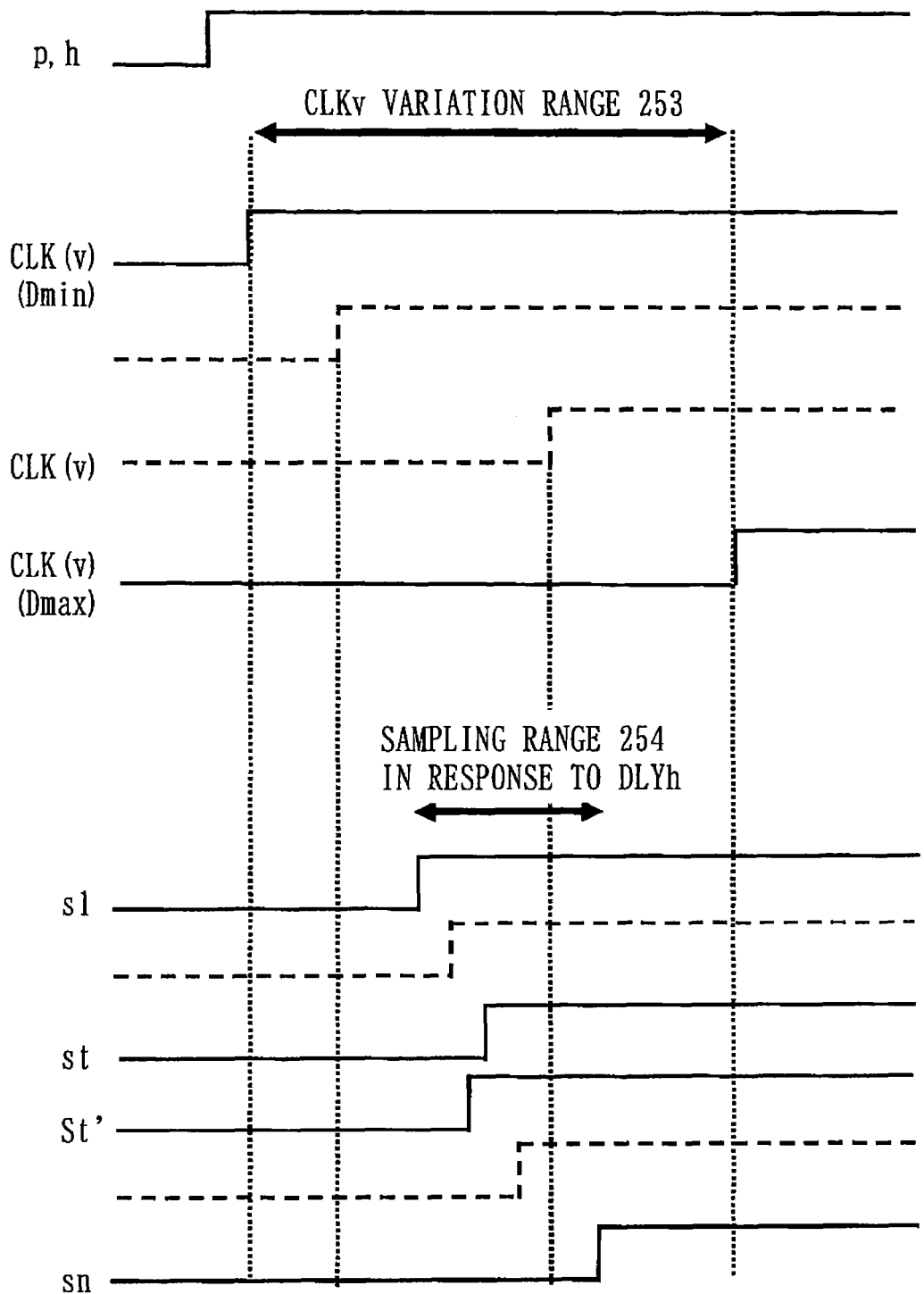
FIG. 17 shows a state of sampling of a messenger signal (h) by the sampling circuit 220, according to Embodiment 1.

(3) At this time, the CPU 500 inputs the messenger signal (h) N times in response to the same control signal (D) (S803). The input of the messenger signal (h) is executed by respectively changing the signal lines of the messenger signal (h) and the control signal (p) shown in FIG. 8 from 0 to 1 at the same timing (the same cycle). Thereby, the processing shown in the timing chart of FIG. 17 is performed in the delay circuit 209 for sampling and the sampling registers 210. FIG. 17 shows the state of sampling of the messenger signal (h) by the sampling circuit 220.

(1) With reference to FIG. 17, first, the case of the value of the control signal (D) being small (that is, the case of delay of the variable delay circuit 207 being small) will be explained. When the value of the control signal (D) is small, a rising edge of the CLK(v), which is a clock input to the sampling registers 210, occurs before the section (the sampling range 254 for DLY(h) in FIG. 17) where a rising is observed due to propagation of the messenger signal (h) in the delay circuit 209 for sampling. Therefore, all of the sampling registers 210 latch zeros (0s). That is, each register R of the sampling registers 210 latches zero (0) with respect to respective signals s1 to sn.

(2) Conversely, when the value of the control signal (D) is large, a rising edge of the CLK(v) occurs after the section where a rising is observed due to propagation of the messenger signal (h). Therefore, in this case, all of the sampling registers 210 latch ones (1s). That is, each register R of the sampling registers 210 latches one (1) with respect to respective signals s1 to sn.

(3) When performing the same processing (changing, respectively, the signal lines of the messenger signal (h) and the control signal 1 (p) from 0 to 1 at the same timing, and performing latching by the sampling registers 210) while varying the control signal (D) between from the minimum value to the maximum value, the signal lines s1 to sn change to 1 in order from the signal line having the fastest propagation of the messenger signal (h).

(Order Reversal of Signal Delay of Signal Line sk)

As to the propagation of the messenger signal (h), it is shown in FIG. 17 that the propagation of the messenger signal (h) of the signal line s1 is fastest and that of the signal line sn is slowest. However, in the case of making the granularity of each delay of the delay circuit 209 for sampling fine, although it is t<t' like the relation between the signal lines st and st' of FIG. 17, there is a possibility that signal lines whose signal delay values are st>st' are generated. This phenomenon occurs due to a wiring delay of from the delay circuit 209 for sampling to the sampling registers 210, and a jitter of the CLK(v).

In order to correctly measure the order relation of signal delays of the signal lines from s1 to sn, the CPU 500 varies the control signal (D) between from the minimum value Dmin to the maximum value Dmax in the timing chart of FIG. 17. The glitch shape determination circuit 211 stores the number of times of 1 latched by each register R of the sampling registers 210 (S805), compares sum values (S806) of the number of times of respective registers R (S807) to sort the order relation of respective registers R of the sampling registers 210, and stores the sorting result as a sort result RegO (S808). The sort result RegO is used when accurately restoring shapes of glitches (mentioned later in S708). The glitch shape determination circuit 211 stores a value Dg of the control signal (D) when an output m' of the register Rn' at the representative value position of the sampling registers 210 becomes 1 for the first time (S809). As the value n', n/2 can be exemplified.

(Reason for Repeat Processing of S803)

The reason for performing repeat processing in response to the same control signal (D) in S803 is to increase the accuracy of data to be latched, because data latched by a register where a change of data and a clock rising timing are close to each other becomes unstable with respect to each register R of the sampling registers 210.

(Glitch Shape Acquisition Processing)

Now, return to the explanation of glitch shape acquisition processing of FIG. 15. After the jitter correction processing, the CPU 500 performs initial setting processing for the glitch shape acquisition processing (S702). In this initial setting processing, after initializing all the registers, the CPU 500 sets the control signal sel (2) as a signal value for selecting the signal g. Moreover, the CPU 500 sets the control signal (D)

that determines a delay value of the variable delay circuit 207, as the value Dg stored in the jitter correction processing. This aims to acquire the signal g of the glitch generating circuit 205 at the timing of rising of the CLK(v) having acquired the signal DLY(h) of the delay circuit 206 for messenger signals that has the same number of logical stages as that of the glitch generating circuit 205.

After the initial setting, the CPU 500 sets sel (1) as an initial value (i=1) (S704), inputs data into the data registers 204, and simultaneously, asserts a control signal (p) from 0 to 1 (S707). Thereby, a signal change occurs in association with the input change of X in the glitch generating circuit 205. That is, a signal g is output from the glitch generating circuit 205, and transmitted to the delay circuit 209 for sampling via the selector 208. Then, the transmitted signal g is latched by each register of the sampling registers 210.

Figure 18:
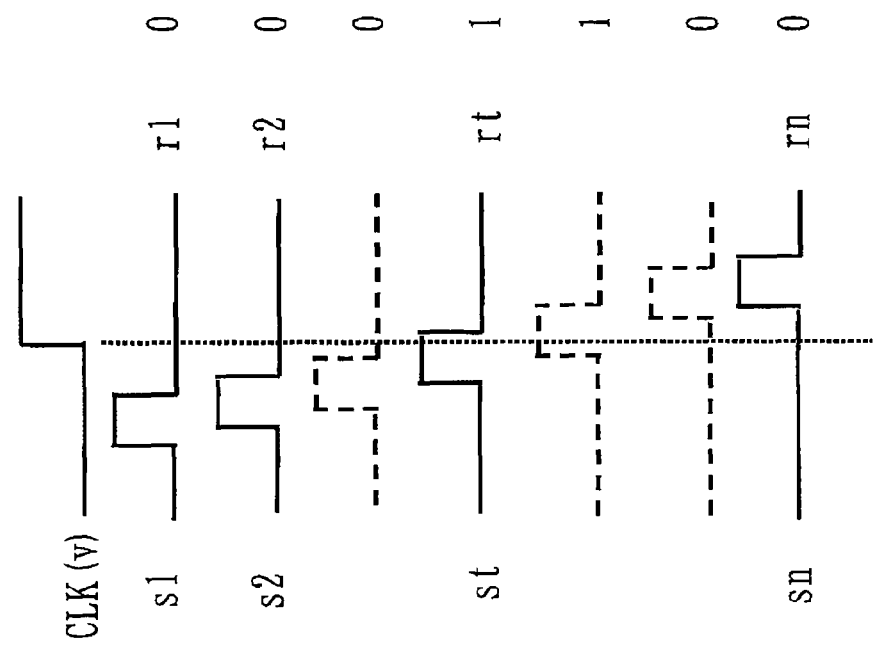
FIG. 18 shows data to be latched by sampling registers 210, according to Embodiment 1.
Figure 19:
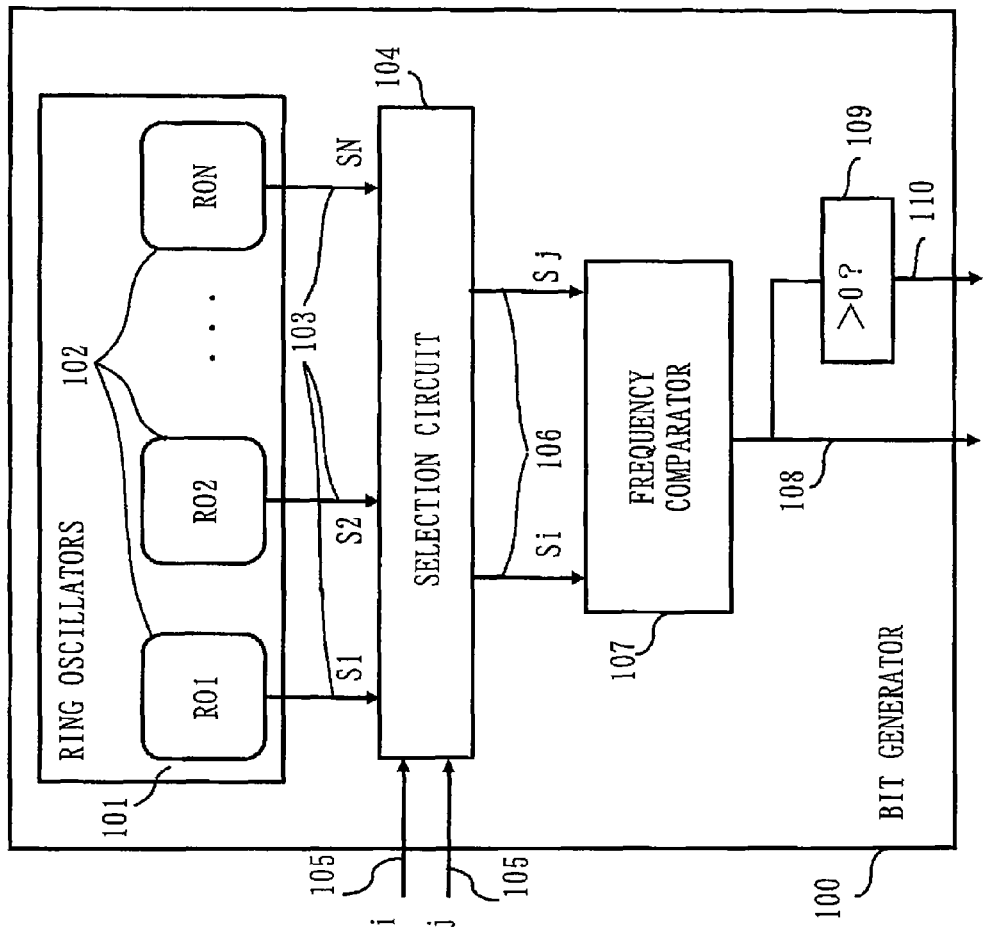
FIG. 19 shows a conventional art.

FIG. 18 shows the data of r1, ..., rn to be latched by the sampling registers 210, henceforth also called latch data. As shown in FIG. 18, the values of the latched data r1, ..., rn are determined according to the shapes of the signals g output from the glitch generating circuit 205. The glitch shape determination circuit 211 performs glitch shape correction (S708) by sorting the data r1, ..., rn, which is latched by the registers R1 to Rn of the sampling registers 210, based on the sorting result RegO stored in the jitter correction processing. The glitch shape determination circuit 211 converts the corrected data, namely the sorted r1, ..., rn, to 1-bit data b by the shape determination processing (S709).

Referring to FIG. 15, an example of conversion to the 1-bit data b by the glitch shape determination circuit 211 will be explained. As described with reference to FIG. 15, the reproducibility of data can be improved when processing of ignoring a signal change (below a threshold w) for a very short period of time, whose data reliability is low, is included in the shape determination processing.

(i, and j in FIG. 15)

As shown in FIG. 15, the processing described above is performed repeatedly while varying the input data X (variable j) and the control signal sel (1) (variable i) in the bit sequence generation apparatus 200. The variables i, j, and k of FIG. 15 indicate as follows:

Variable i: indicating a signal line selected according to sel (1), from "1 to v" signal lines Variable j: indicating one input data X in 2" (j=0 to 2"−) input data Xs Variable k: indicating the number of times of repetition for the same X and sel (1)

In order to increase the reliability of data, repeat processing is performed also in response to the same input data X and the control signal sel (1). That is, as shown in FIG. 15, the repeating is performed from K=1 to K=N while fixing the variables i and j. As an example of this processing, the glitch shape determination circuit 211 performs majority processing for b(i, j, 1), b(i, j, 2), b(i, j, N), where i and j do not change but K changes, and the result is defined as b(i, j)_Finally, a bit sequence b(i, j) composed of a plurality of 1-bit data b(i, j), which were obtained in the above processing and whose i and j vary, is used as key information.

FIG. 15 shows a flow in which a specific signal line i is focused and the same input data Xj is input into the line repeatedly N times in order to evaluate the reliability of 1-bit data generated from the output of the specific signal line i in response to the same input data Xj. In FIG. 15, by performing switching of i and j, evaluation is performed, for each signal line i (i:1 to v), with respect to reliability of 1-bit data generated from outputs of respective signal lines i (i:1 to v) in response to respective input data Xj (j:0 to 2°-1).

The flow of FIG. 15 can be applied, for example, to both the "time of initial key generation" explained in the above as "1.4 Improvement of Error Rate" and "after the time of initial key generation". This will be explained below.

(Initial Key Generation Time)

At the time of initial key generation, the reliability of generated bits is improved by the following processing, for example. The random logic circuit 2051 (combinational circuit) repeatedly inputs the same input data Xj. The selector 2052 of the glitch generating circuit 205 outputs a signal g (bit corresponding signal) N times (a predetermined number of times) from each of v bit signal lines in a manner such that the signal g is output from one of the bit signal lines each time the same input data Xj is repeatedly input into the random logic circuit 2051. The outputs of the selector 2052 are based on the control by the control signal sel (1). The glitch shape determination circuit 211 (bit data generating unit) generates 1-bit data (N 1-bit data) corresponding to each of the signals g output N times, for each of the v bit signal lines. Then, the glitch shape determination circuit 211 determines whether or not to use the output of each bit signal line in response to the same input data X, in accordance with the ratio of 1 and 0 in the total of 1-bit data generated for each bit signal line. That is, since the signal g is output N times from each bit signal line, N 1-bit data, each 1-bit data being either 1 or 0, is generated for each bit signal line by the glitch shape determination circuit 211. The glitch shape determination circuit 211 determines whether or not to use the output of each bit signal line in response to the same input data X, in accordance with the ratio of 1 and 0 in the N 1-bit data for each bit signal line. This determination is performed such that the bit signal line i is determined to be used only when all of the N 1-bit data are ones (1s) or all of the N 1-bit data are zeros (0s), wherein each 1-bit data is based on the signal g output from the bit signal line i in response to the input data X (0), for example. As described in "1.4 Improvement of Error Rate", mask values can be used to determine whether or not to use the output of each bit signal line.

(After Determining To Use Or Not Bit Signal Line)

When a mask value has been generated, the reliability is determined with respect to an output of the bit signal line which was determined to be used in response to the same input data X. After determined by the glitch shape determination circuit 211 that the output of the bit signal line in response to the same input data X can be used, the random logic circuit 2051 again repeats to input the same input data X. Every time the same input data X is repeatedly input into the random logic circuit 2051, the selector 2052 outputs the signal g (bit corresponding signal) a predetermined number of times (for example, N' times) from a specific determined signal line, which is a bit signal line whose output is determined, by the glitch shape determination circuit 211, to be used. The glitch shape determination circuit 211 generates N' 1-bit data corresponding to each signal g output, N' times, from the specific determined signal line, and based on the ratio of 1 and 0 included in a bit group composed of the total (N') of generated 1-bit data, determines a representative bit that represents the bit group to be either 1 or 0. Majority processing can be used to determine the representative bit, as mentioned above. By performing the same processing in response to the same input data X repeatedly input, the random logic circuit 2051, the selector 2052, and the glitch shape determination circuit 211 determine a representative bit for the same input data X, with respect to at least one other determined signal line. Then, the glitch shape determination circuit 211 (bit sequence generating unit) generates a bit sequence by using a plurality of determined representative bits.

With respect to other input data X' different from the input data X, a representative bit can be determined for each determined signal line by repeatedly inputting the data X' as the same data. In FIG. 15, while fixing the bit signal line i, input data X (0) is input N times first, then, input data X (1) is input N times, and, finally input data X ($2^m-1$) is input N times. As this is an example, it is also acceptable to change over "i" of the signal line i while fixing the input data Xj.

Thus, first, the glitch shape determination circuit 211 determines whether or not to use the output of each bit signal line at the time of generating an initial key. Next, the glitch shape determination circuit 211 generates a representative bit with respect to the output of the bit signal line determined to be used. Thereby, the reliability of a generated bit sequence can be improved. Moreover, by correcting errors of such generated bit sequence by using the error correction circuit 300, the reliability of the bit sequence can be further improved.

The bit sequence generation apparatus 200 has been described that acquires glitch shapes and generates a bit sequence based on the glitch shapes. Since glitch shapes behave differently depending on the delay relation between respective logical gates configuring the glitch generating circuit 205, a bit sequence unique to the device, being different from that of other device, is generated for each device. Then, in every generation in the same device, the same bit sequence is generated from glitches. Since glitches are generated by inputting data into the glitch generating circuit 205, naturally it is not necessary to non-volatilely store key information.

Since there is no special restriction to alignment and wiring of the bit sequence generation apparatus 200 according to Embodiment 1, it is possible to output a different bit sequence per device even in an FPGA having a low degree of freedom of alignment and wiring.

Moreover, in the bit sequence generation apparatus 200 according to Embodiment 1, since there is no processing unit that needs a loop circuit formed of a combinational circuit, it is possible to provide a PUF circuit which does not violate the "design rules described in the Technical Problem".

As described above, the bit sequence generation apparatus 200 has been explained in Embodiment 1. Also, it is possible to understand the bit sequence generation apparatus 200 as a bit sequence generation method by comprehending the operations of the configuration elements of the bit sequence generation apparatus 200, as the method steps.

Reference Signs List

100 Bit Generator, 101 Ring Oscillators, 102 Ring Oscillator, 103 Output Signal, 104 Selection Circuit, 105 Selection Signal, 106 Signal, 107 Frequency Comparator, 108 Comparison Result, 109 Response Bit Value, 200 Bit Sequence Generation Apparatus, 202 Data Bus, 203 Control Registers, 204 Data Registers, 205 Glitch Generating Circuit, 206 Delay Circuit for Messenger Signals, 207 Variable Delay Circuit, 208 Selector, 209 Delay Circuit for Sampling, 210 Sampling Registers, 211 Glitch Shape Determination Circuit, 220 Sampling Circuit, 300 Error Correction Circuit, 400 Cryptographic Processing Circuit, 500 CPU, 600 Internal Memory, 700 External UF, 1000 System LSI

The invention claimed is:

1. A bit sequence generation apparatus comprising:
    a glitch generating unit that generates a glitch;
    a glitch waveform acquisition unit that acquires a waveform of the glitch generated by the glitch generating unit;
    a bit data generating unit that generates 1-bit data indicating either one of 1 and 0, based on the waveform of the glitch acquired by the glitch waveform acquisition unit; and
    a bit sequence generating unit that generates a bit sequence composed of a plurality of the 1-bit data generated by the bit data generating unit;
    wherein the glitch generating unit includes
    a combinational circuit, wherein a plurality of logic circuits are combined, to generate the glitch, due to a transition, in response to input data inputted and output the glitch, and
    the glitch waveform acquisition unit includes
    a glitch delay unit to input the glitch from the combinational circuit, and delay the glitch inputted.

2. The bit sequence generation apparatus according to claim 1,
    wherein
    the glitch waveform acquisition unit includes
    a sampling unit to sample the glitch delayed by the glitch delay unit.

3. The bit sequence generation apparatus according to claim 2,
    wherein the combinational circuit inputs input data X of u bits (u being an integer greater than or equal to 1) as the input data, performs an operation of Y=f(X) for calculating output data Y being data of v bits (v being an integer greater than or equal to 1), by using the input data X, and includes v bit signal lines each of which outputs the output data Y including the glitch per bit, and
    the glitch generating unit further includes a glitch output selector to input a selection signal indicating an output from one of the bit signal lines, and output a bit corresponding signal, which corresponds to the bit, from a bit signal line indicated by the selection signal inputted.

4. The bit sequence generation apparatus according to claim 3,
    wherein the combinational circuit inputs the input data X being different from each other, and
    the glitch output selector outputs the bit corresponding signal from each of the bit signal lines in response to each of the input data X, by controlled by the selection signal.

5. The bit sequence generation apparatus according to claim 3,
    wherein the combinational circuit repeatedly inputs same input data X,
    the glitch output selector outputs the bit corresponding signal from each of the bit signal lines a predetermined number of times, by performing outputting the bit corresponding signal from one of the bit signal lines every time the same input data X is repeatedly input into the combinational circuit, and
    the bit data generating unit generates the 1-bit data corresponding to each of the bit corresponding signal which was output the predetermined number of times, for each of the bit signal lines, and determines an output of the each of the bit signal lines in response to the same input data X to be either one of usable and unusable, in accordance with a ratio of 1 and 0 in a total of the 1-bit data generated for the each of the bit signal lines.

6. The bit sequence generation apparatus according to claim 5,
    wherein the bit data generating unit determines the output of the bit signal lines,
    which is in response to the same input data X, to be usable, in either one of cases where a ratio of 1 in the total of the 1-bit data generated based on the bit corresponding signal output from the bit signal lines is 100% and where a ratio of 0 is 100%.

7. The bit sequence generation apparatus according to claim 5,
wherein the combinational circuit again repeats to input the same input data X after the bit data generating unit determined the output of the bit signal lines in response to the same input data X to be usable,
the glitch output selector outputs the bit corresponding signal a predetermined number of times from a specific determined signal line being the bit signal line whose output is determined by the bit data generating unit to be usable, every time the same input data X is repeatedly input into the combinational circuit,
the bit data generating unit generates the 1-bit data corresponding to the bit corresponding signal, for each of the bit corresponding signal which was output the predetermined number of times from the specific determined signal line, and based on the ratio of 1 and 0 included in a bit group composed of the total of the 1-bit data generated, determines a representative bit representing the bit group to be either one of 1 and 0,
the combinational circuit, the glitch output selector, and the bit data generating unit determine the representative bit in response to the same input data X, with respect to at least one other the determined signal line, by performing same processing for the same input data X which is repeatedly input, and
the bit sequence generating unit generates the bit sequence by using a plurality of the representative bits determined by the bit data generating unit.

8. The bit sequence generation apparatus according to claim 2, further comprising:
an error correction unit that corrects an error of the bit sequence generated by the bit sequence generating unit.

9. The bit sequence generation apparatus according to claim 2,
wherein the glitch delay unit includes a plurality of delay elements that are connected in series with a signal line, and that delay and propagate the glitch, and
the sampling unit includes a plurality of registers, each having an input signal line, a clock signal line, and an output signal line, wherein the input signal line of each register is connected to either one of an input side and an output side of one of the plurality of delay elements without overlapping with each other, to latch information at a connection part of the input signal line in conjunction with a rising of the clock signal input from the clock signal line, and
the bit sequence generation apparatus further comprising:
a messenger signal delay unit that inputs a messenger signal, being a signal which rises from zero to a predetermined value, delays the messenger signal inputted, and outputs the messenger signal delayed to a first delay element connected in series in the glitch delay unit, and a variable delay unit that inputs the clock signal to be input into the each register of the sampling unit and a control signal to control an output timing of the clock signal inputted, and outputs the input clock signal to the each register of the sampling unit at a timing in accordance with the control signal inputted.

10. The bit sequence generation apparatus according to claim 9,
wherein the bit data generating unit, based on a value of latch data of the each register latched by the each register of the sampling unit by latching the messenger signal delayed, output from the messenger signal delay unit, while interlocking with the clock signal output from the variable delay unit, sorts the latch data of the each register, and stores a sort result.

11. The bit sequence generation apparatus according to claim 10,
wherein the bit data generating unit sorts signals output from the glitch generating unit and latched by the each register, based on the sort result stored, when the each register of the sampling unit latches a signal output from the glitch generating unit to the glitch delay unit.

12. The bit sequence generation apparatus according to claim 9,
wherein the bit data generating unit repeatedly performs sampling of the messenger signal by using the each register of the sampling unit, for a same setup of the messenger signal in the messenger signal delay unit and the clock signal in the variable delay unit.

13. The bit sequence generation apparatus according to claim 2,
wherein the glitch delay unit delays a signal by using a carry signal of an adder.

14. The bit sequence generation apparatus according to claim 1,
wherein the bit data generating unit generates the 1-bit data of either one of 0 and 1 depending on a number of rising edges, being one of an odd number and an even number, included in the waveform of the glitch acquired by the glitch waveform acquisition unit, and when a width of a pulse of the waveform of the glitch is less than or equal to a threshold w, ignores the pulse.

15. A bit sequence generation method comprising:
generating a glitch, using a plurality of logic circuits which are combined to generate the glitch in response to a transition in inputted input data;
acquiring a waveform of the glitch generated, including delaying the glitch generated using the plurality of logic circuits;
generating 1-bit data indicating either one of 1 and 0, based on the waveform of the glitch acquired; and
generating a bit sequence composed of a plurality of the 1-bit data generated.

* * * * *